United States Patent
Kotani et al.

[19]

[11] Patent Number: 6,101,536
[45] Date of Patent: Aug. 8, 2000

[54] COMMUNICATION APPARATUS AND COMMUNICATION DISPLAYING METHOD WITH REMOTE MONITORING FUNCTION

[75] Inventors: Masaaki Kotani, Yokohama; Hiroki Yonezawa, Tokyo, both of Japan

[73] Assignee: Canon Kabushiki Kaisha, Tokyo, Japan

[21] Appl. No.: 09/056,984

[22] Filed: Apr. 8, 1998

[30] Foreign Application Priority Data

Apr. 10, 1997 [JP] Japan ................................ 9-092194

[51] Int. Cl.$^7$ ........................................... G06F 13/00
[52] U.S. Cl. ...................... 709/217; 709/320; 345/329; 348/143
[58] Field of Search .................... 709/204, 217, 709/218, 224, 313, 328, 320; 345/327, 329, 330, 331, 332, 348, 349; 348/15, 16, 143

[56] References Cited

U.S. PATENT DOCUMENTS

| | | |
|---|---|---|
| 4,745,479 | 5/1988 | Waehner ............................ 348/588 |
| 5,115,310 | 5/1992 | Takano et al. ..................... 348/722 |
| 5,625,410 | 4/1997 | Washino et al. ................... 348/154 |
| 5,657,096 | 8/1997 | Lukacs .............................. 348/585 |
| 5,706,457 | 1/1998 | Dwyer et al. ..................... 345/349 |

*Primary Examiner*—Viet D. Vu
*Attorney, Agent, or Firm*—Morgan & Finnegan, L.L

[57] ABSTRACT

In an apparatus capable of communication with plural image transmitting terminals, improved operability is provided in selectively receiving and displaying images from the active terminals among plural image transmitting terminals. For this purpose, there is provided instruction means for entering an instruction for grouping the active terminals among the plural image transmitting terminals, generation means for grouping the active image transmitting terminals according to the instruction from the instruction means and generating a symbol corresponding to such group, and output means adapted, in response to an access to the symbol, to provide a monitor with images consisting of image data received from the active image transmitting terminals.

21 Claims, 19 Drawing Sheets

SHAPE OF MOUSE CURSOR WHEN DRAG AND DROP

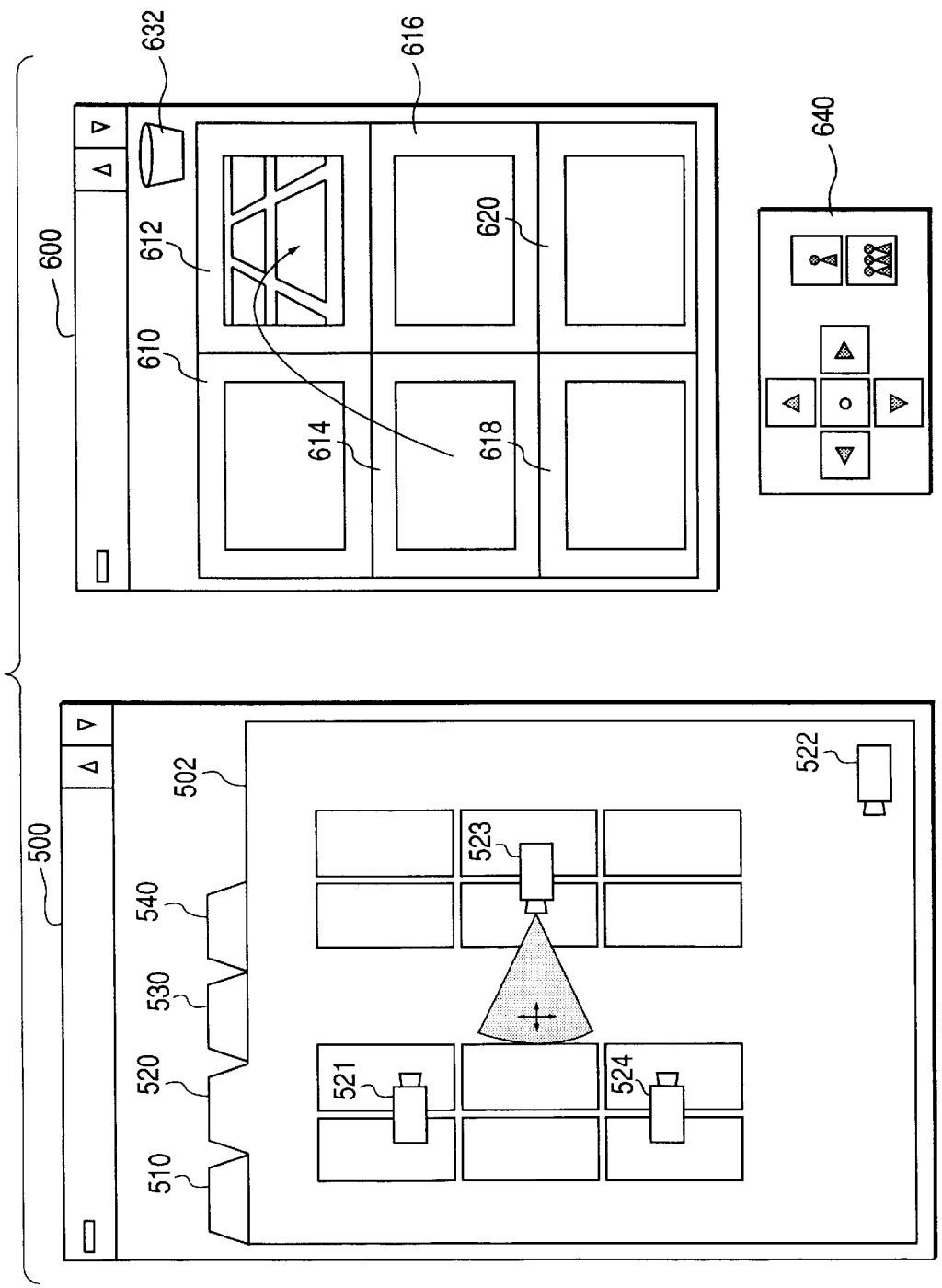

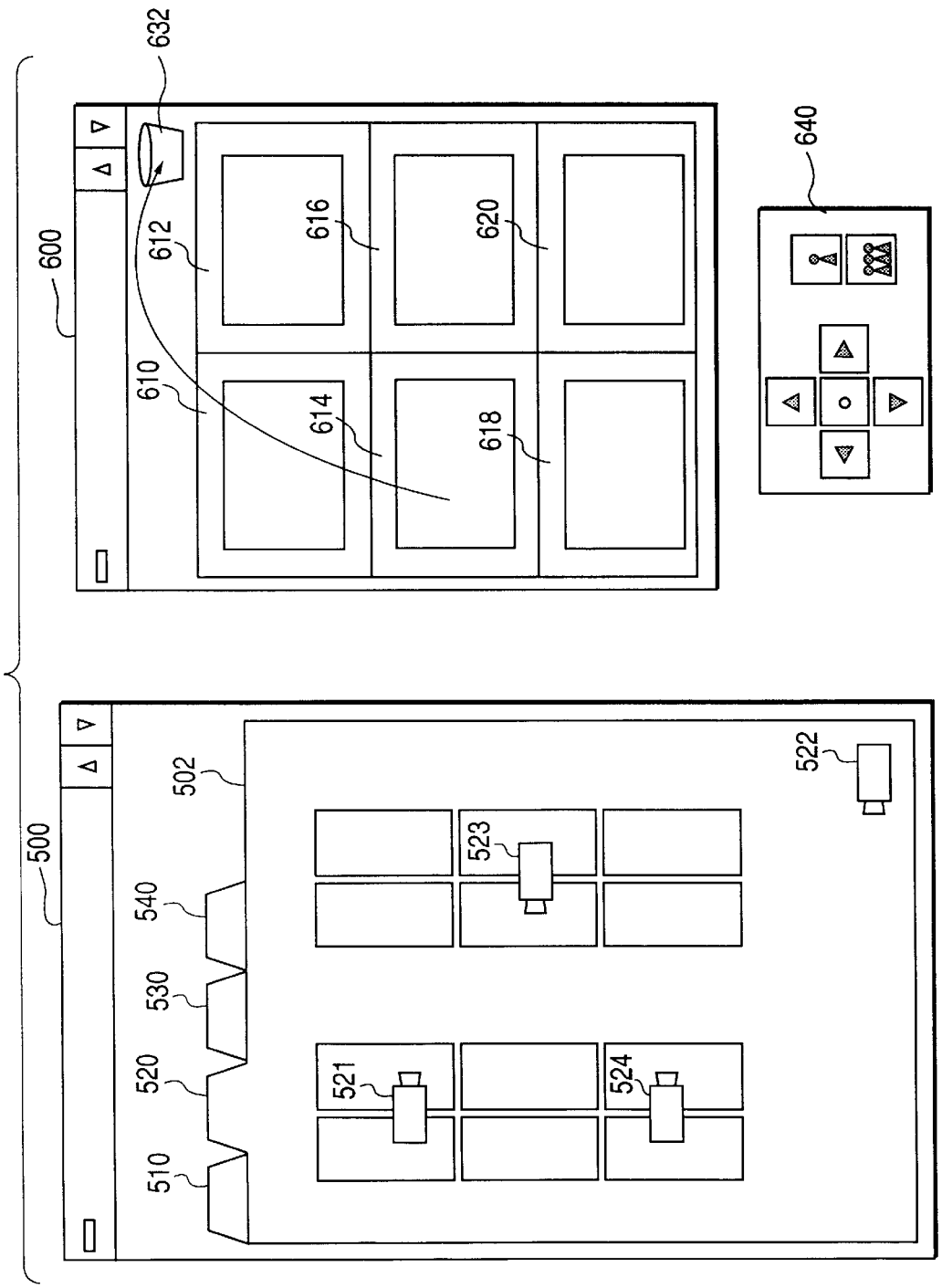

FIG. 11

GROUP NAME

MAP DISPLAY SOFTWARE

CAMERA CONTROL CLIENT

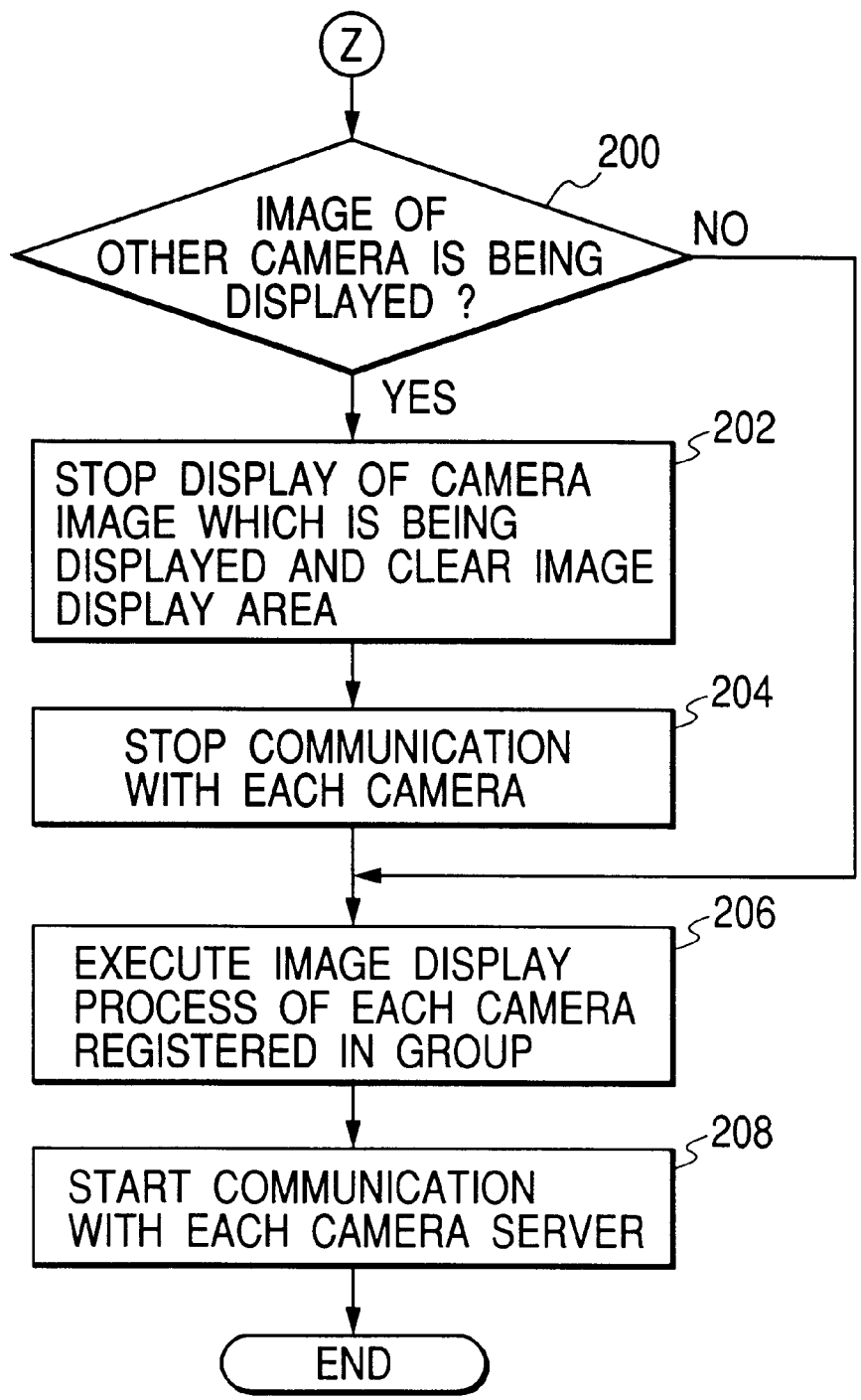

COMMUNICATION APPARATUS AND COMMUNICATION DISPLAYING METHOD WITH REMOTE MONITORING FUNCTION

BACKGROUND OF THE INVENTION

1. Field of the Invention

The present invention relates to a communication apparatus, and more particularly to a communication apparatus with a remote monitoring function and acommunication display method therefor.

2. Related Background Art

A monitoring apparatus as an example of such communication apparatus is composed of several video cameras, a synthesizing device for analog synthesis of the images therefrom, and a device called switcher, capable of selecting such images. Such system is principally utilized in a relatively small-sized building and is called a local monitoring system. In contrast to such local monitoring system, there is recently developed a remote monitoring system utilizing a digital network such as LAN or ISDN for the image transmission channel instead of analog cables, thereby enabling significant extension of the transmission path.

Among the recent monitoring systems, there have been announced ones utilizing IBM compatible personal computers (PC) for the monitoring terminals and realizing system control and image display by graphic user interface (GUI). The use of GUI with computer in the monitoring apparatus provides an advantage of easier handling even for the unskilled personnel.

However, though such conventional systems utilize the digital network for the image transmission channel, the display on the monitor is conducted in the analog manner, so that the display position of the image from the video camera is strongly dependent on the hardware of the system. For this reason, the display position of the image from the video camera is fixedly assigned in an image display position on the specified monitoring terminal at the installation of the system, and it has not been possible for the monitoring user to arbitrarily change the image display position for the convenience of monitoring or to select the images of the video cameras to be monitored.

Also in the conventional configuration, it has been necessary, in case of communicating image data with plural image transmitting terminals, to designate the instruction for communication for each of such image transmitting terminals constituting the counterparts of communication.

Also in the conventional configuration, the instructions to be given by the operator increase in proportion to the increase of the number of the image transmitting terminals constituting the counterparts of communication, so that such configuration is not convenient for use.

Furthermore, the conventional configuration in which the display positions of the received images are fixed is unable to cope with the increase in the number of the image transmitting terminals constituting the counterparts of communication.

SUMMARY OF THE INVENTION

In consideration of the foregoing, an object of the present invention is to provide a communication apparatus and a communication method, convenient for use by the user.

Another object of the present invention is to provide a communication apparatus and a communication display method, allowing to improve the operability in collectively displaying images corresponding to the image data received from plural image transmitting terminals.

The above-mentioned objects can be attained, according to the present invention, by a communication apparatus comprising:

instruction means for entering an instruction for grouping, among plural image transmitting terminals, those in activated state;

generation means adapted, in response to the instruction from the instruction means, for grouping the activated image transmitting terminals and generating a system corresponding to such group; and output means adapted, in response to an access to the symbol, for outputting, to a monitor, images composed of the image data received from the activated image transmitting terminals.

Still another object of the present invention is to provide a communication apparatus and a communication method provided with novel functions.

Still other objects of the present invention, and the features thereof, will become fully apparent from the following description which is to be taken in conjunction with the attached drawings, and from the appended claims.

BRIEF DESCRIPTION OF THE DRAWINGS

FIG. 8 is a view showing the display when the image display area is changed by the drag and drop operation;

FIG. 10 is a view showing a state after the image display is interrupted by the drag and drop operation;

FIG. 11 is a view showing a dialog box for entering the group name;

FIG. 23 is a flow chart showing the control sequence in the group display process.

DETAILED DESCRIPTION OF THE PREFERRED EMBODIMENTS

[Embodiment 1]

In the following an embodiment 1 of the present invention will be explained in detail, with reference to the attached drawings.

Figure 1:
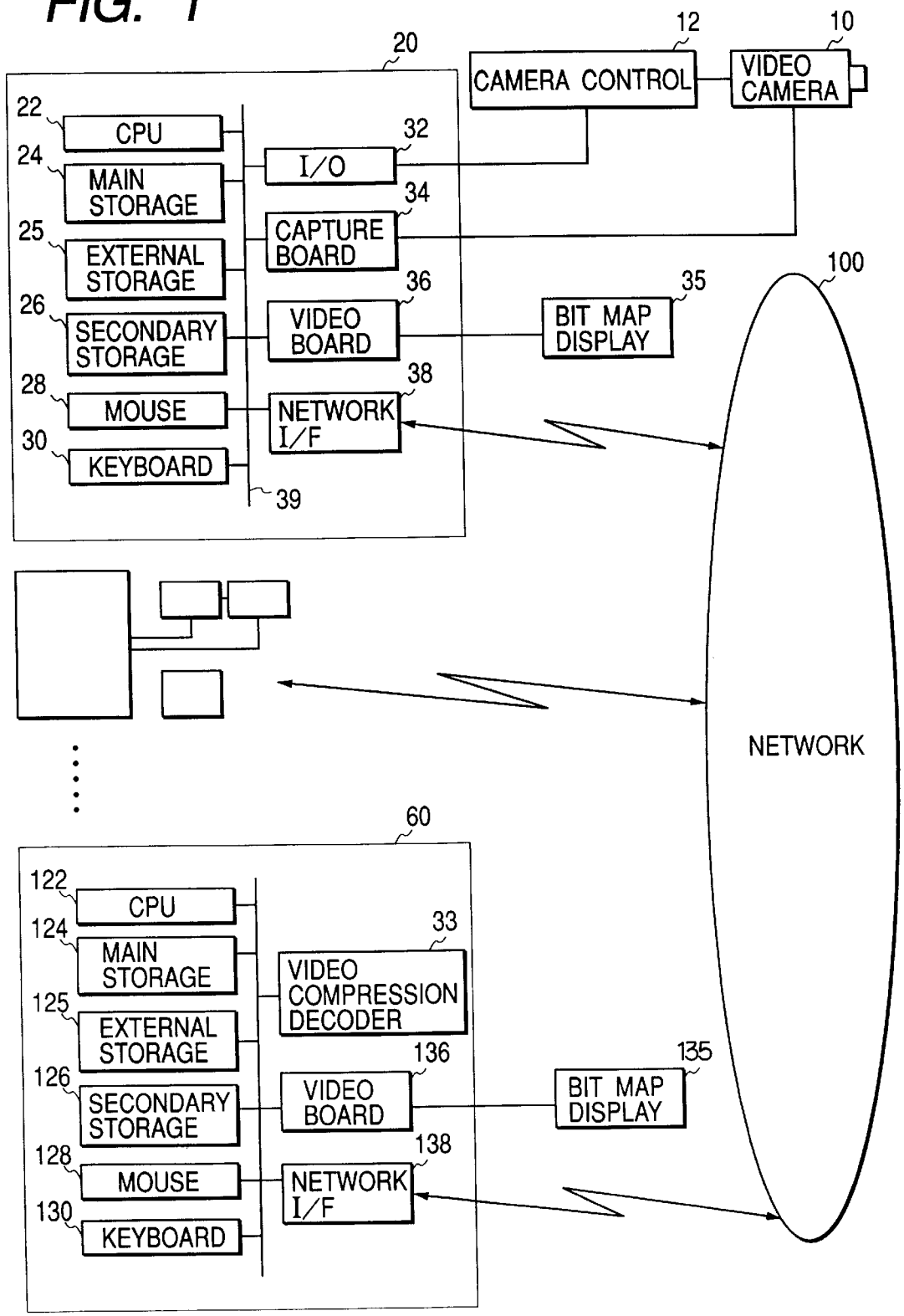
FIG. 1 is a block diagram of a terminal constituting an embodiment of the present invention.

FIG. 1 is a block diagram showing the schematic configuration of a terminal of the present embodiment. The image transmitting terminal of the present embodiment is used in combination with a video camera serving as an example of the image signal generating device, and serves to receive a video camera control signal from a monitoring terminal functioning as an image receiving terminal, to actually control the video camera and to execute A/D conversion and data compression of the image signal from the video camera, for transmission to a network.

Referring to FIG. 1, there are shown a video camera 10, and a camera control circuit 12 for directly controlling the panning, tilting, zooming, focusing, diaphragm controlling etc. of the video camera 10 according to an external control signal, which is entered from an interface defined for example by RS-232C.

The camera control circuit 12 is not essential if the panning, tilting etc. of the video camera 10 are not controllable, but the control circuit 12 may be so constructed as to effect the on/off control of the power source of the video camera 10. A computer 20 serves to control the video camera 10 connected to the camera control circuit 12 by sending control codes thereto and to transmit the image data obtained from the video camera 10 to the network through a network interface 38. It may be composed, for example, of a work station (WS) or a personal computer (PC). In the following there will be explained the configuration of the computer 20 in the present embodiment. It is including a CPU 22 for controlling the entire circuitry; a main memory 24; a secondary memory device 26 such as a hard disk; a mouse 28 serving as a pointing device, which need not be limited to such mouse in the present invention but can also include another device such as a touch panel on a display 35; a keyboard 30; and a removable external memory device 25 such as a floppy disk or a CD-ROM. The software of the present system may be read from such media or from the network interface and stored in the secondary memory device 26. There are further provided an I/O board 32 connected to the camera control circuit 12 and serving to transmit or receive the camera control signal; and a video capture board 34 for fetching the video output signal VD of the video camera 10. The video output signal can be in an analog format such as NTSC or in a digital format, but, in case of the analog format, there is required an A/D converting function. The video capture board 34 need not be provided with the data compressing function, but a software compression is desirable if such compressing function is absent. The captured image is supplied from a graphic board 34, through a bus 39, to a video board 34 and displayed in an arbitrary position on a bit map display 35. The position of such display is controlled by an instruction of the display position and/or display area from the CPU 22. A system bus 39 connects the various devices from the CPU 20 to the network interface 38.

The above-described configuration allows to transmit the image to a remote monitoring terminal through a network 100 and to control the camera by the camera control signal from the monitoring terminal. FIG. 1 also schematically shows the configuration of the monitoring terminal (image receiving terminal) 60. The monitoring terminal 60 serves to transmit a control signal for the video camera 10 to the image transmitting terminal 20, which controls the video camera 10 according to such control signal and returns the resulting state of the video camera 10. The monitoring terminal 60 displays such state of the video camera on a display device, such as the bit map display 135. It also serves to receive the image data transmitted from the image transmitting terminal 20, to execute decompression of the encoded data by a software and real-time display of the decompressed data on the display device. As will be understood from FIG. 1, the monitoring terminal 60 is constructed same as the image transmitting terminal 20, excluding however the video camera 10, the camera control circuit 12 and the capture board 34, and the components of equivalent functions as those in the terminal 20 are represented by same numbers with a prefix "1". Naturally the above-mentioned devices need not be particularly excluded. If the CPU 22 is insufficient in the ability and requires time for data compression and decompression, there may be provided an expansion hardware provided with compressing and decompressing functions.

The above-described configuration allows to receive an image from the remote image transmitting terminal 20 through the network 100, to decompress the image, to display it in an arbitrary position on the monitor display device i.e., the bit map display 135, and to transmit a video camera control c od e corresponding to a control instruction fo r the video camera, entered by the operator from the keyboard 130 or the mouse 128 to the image transmitting terminal.

Figure 2:
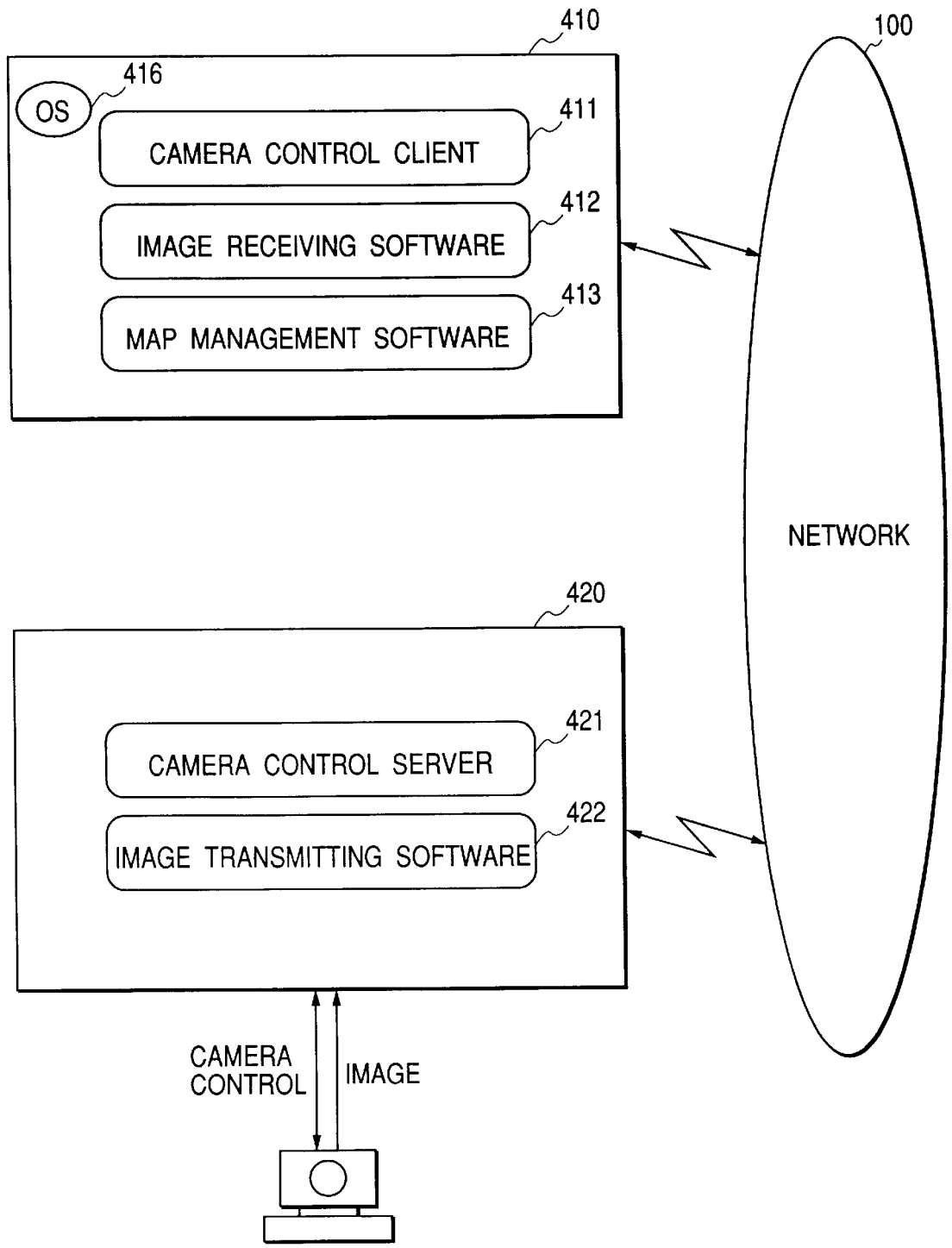
FIG. 2 is a block diagram of softwares constituting an embodiment of the present invention.

FIG. 2 shows the configuration of the software of the present embodiment. A software 410 of the monitoring terminal 60 and plural softwares 420, . . . of the image transmitting terminal 20 etc. are connected to the network 100. In the software 410 of the monitoring terminal, there are installed a camera control client 411 for remote control in g the camera connected to the softwares 420, . . . of the image transmitting terminal on the network, an image receiving software 412 for decompressing and displaying the image data transmitted in a packet format from the image transmitting terminal , and a map management software 413 having GUI (graphic user interface) capable of graphically displaying the panning and zooming of the camera by a map and a camera symbol and also of camera control. The image receiving software 412 has the central function of managing the cameras of all the image transmitting terminals connected to the network 100, and contains the name of each camera, the host name of the computer to which each camera is connected, the information on the state of each camera such as panning, tilting or zooming state, the information on the camera for example whether the camera is controllable, and the information on the current status such as the camera under current control and the camera of which image is currently displayed. Such information is shared also by the camera control client 411 and the map managing software 413 and is utilized for example for changing the display of the camera symbol.

Figure 3:
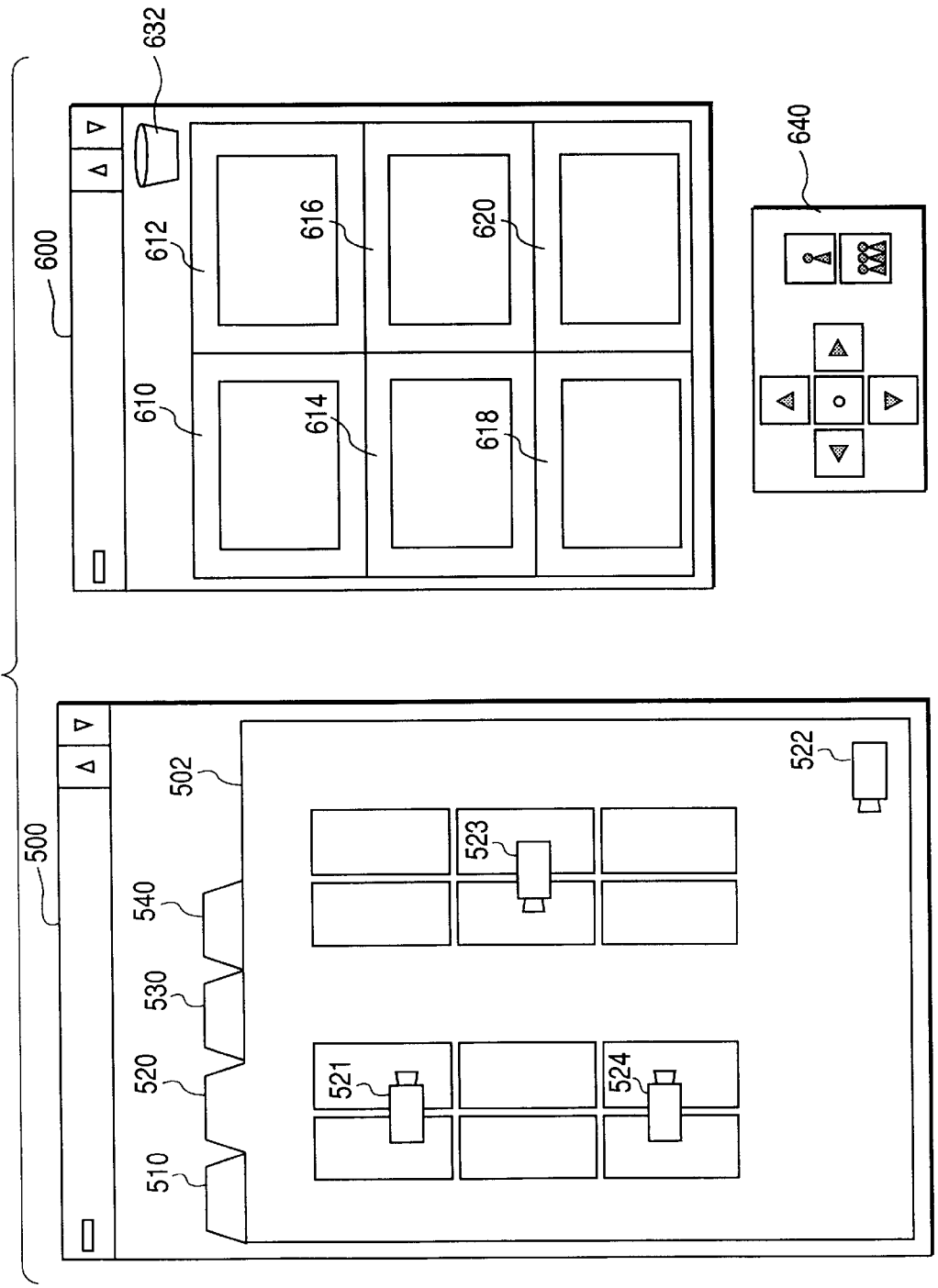
FIG. 3 is a view showing an example of image display of the embodiment.
Figure 4:
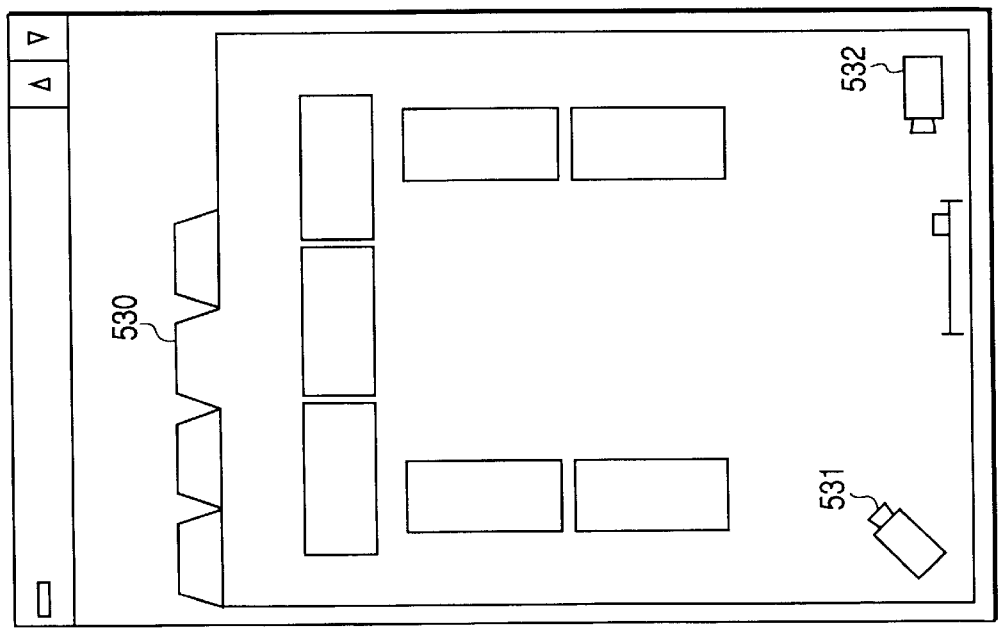
FIG. 4 is a view showing the image display when the map is switched to 530.

FIG. 3 shows an example of the image displayed on the bit map display 135 of the monitoring terminal 410. A map window 500 in the present embodiment manages plural maps 520, 530, 540, . . . such as maps indicating layout of different locations such as an office, a shop and a warehouse, or those of a same location but different positions such as first, second, . . . floors. The number of maps depends on the performance of the system and is not particularly limited. Each map has a tag, and is displayed in a map display area 502 by clicking the tag with the mouse pointer. At the same time there is displayed the symbol of a camera positioned on such map. FIG. 3 shows a state in which a map 520 among the maps 510 to 540 is displayed in the map display area 502, and camera icons 521, 522, 523, . . . are displayed on the map 520. By clicking the tag of the map 530 in this state, the map display area 502 displays the map 530 as shown in FIG. 4, with camera icons 531, 532, . . . .

The map 510 is a particular map called group map, which does not contain the layout display as in other maps but consists of icons, called group icons, which will be explained later.

Figure 6:
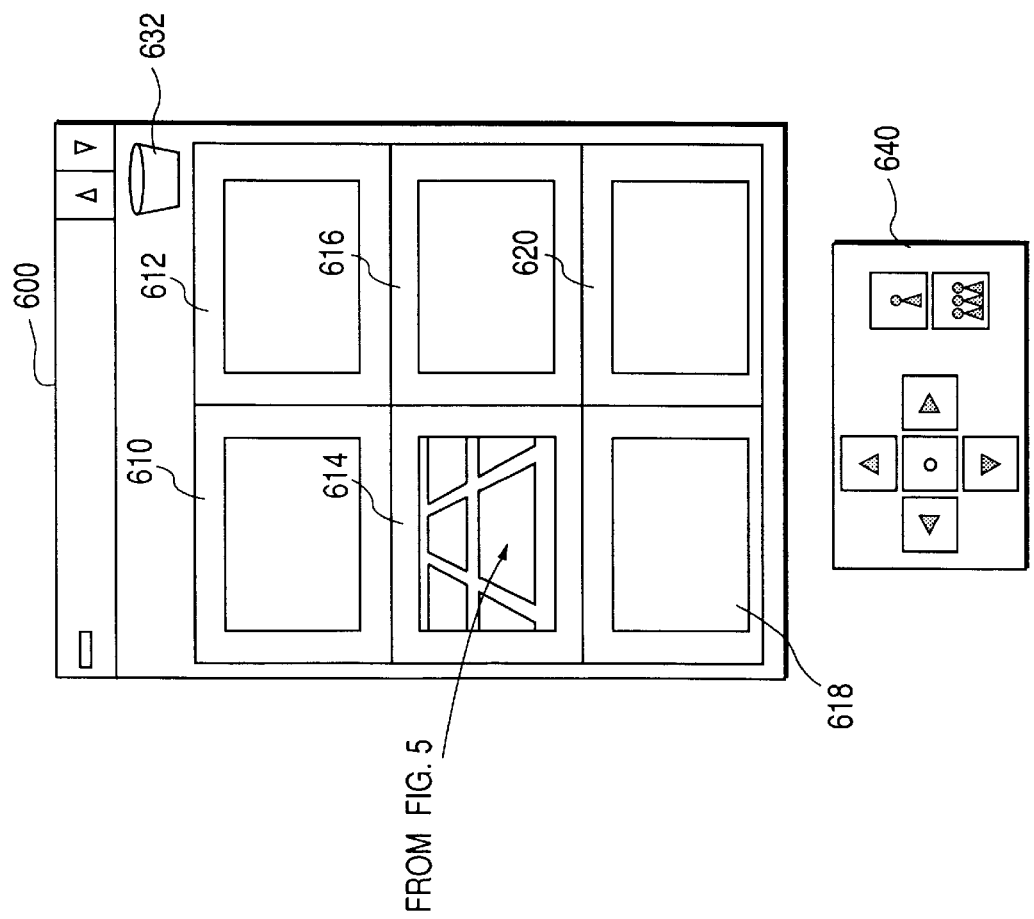
FIG. 6 is a view showing the display after a drag and drop operation.

FIG. 6 shows a window 600 for displaying the input image signal, indicating an example in which the image signal received through the network 100 is displayed in the window.

Figure 7:
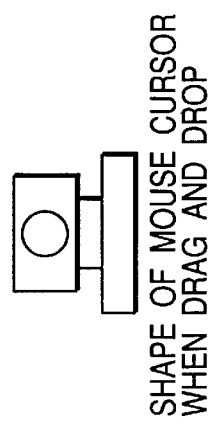
FIG. 7 is a view showing an example of the shape of the mouse cursor in the drag and drop operation.
Figure 9:
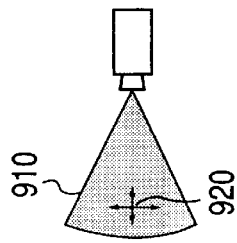
FIG. 9 is a view showing an example of the camera icon in the course of image display.

In FIG. 6, an image display window 600 has image display areas 610, 612, 614, 616, 618, 620. In the present embodiment there are provided six areas, but the number of such areas is naturally not restrictive. Also the map window 500 shown in FIG. 3 and the image display window 600 shown in FIG. 6 may be displayed on a same display area or on different display areas of different monitors in divided manner. There are also shown a dustbin icon 632 for deleting the displayed camera image from the image display area, and a camera controlling panel 640, which is provided with various camera controlling buttons for controlling the panning, tilting and zooming of a selected camera. Also the panel 640 may be displayed on the same image area for the windows 500, 600 or may be displayed on a different display area. Such aspects do not constitute the essential part of the present invention and will not, therefore, be explained further. In the following there will be explained the graphic user interface GUI of the monitoring system of the present embodiment, with reference to FIGS. 6 to 10. In the present embodiment, by executing a drag and drop (D&D) operation of a camera icon on the map 520, 530, . . . to an arbitrary image display area in the image display window, a moving image from the camera corresponding to such dragged and dropped icon is displayed in the dropped image display area. FIG. 6 shows a state in which the icon of a video camera 523 is dragged and dropped in an image display area 614. During the dragging operation, the mouse cursor assumed a camera shape as shown in FIG. 7, whereby the user can confirm that the D&D operation is under execution. In this operation, the map managing software 413 searches the ID number of the camera subjected to the dragging operation, based on the position information thereof, and sends the ID of the dragged and dropped camera to the image receiving software 412, which investigates, based on the ID, the panning/tilting state of the camera, the camera name and the host name to which the camera is connected, and sends these information to the camera control client 411 and the map managing software 413. Based on the information, the camera control client 411 forms the network connection with the camera control server of the image transmitting terminal to which the above-mentioned camera is connected. Thereafter the camera is controlled by the two, but the information on the panning/tilting state of the camera is constantly transmitted from the camera control client 411 to the image receiving software 412. The camera managing software 413 renews the map stored in the video board 136, for example by changing the direction of the camera icon corresponding to the actual camera direction, drawing a scope 910 indicating the display operation is in progress, as shown in FIG. 9, and drawing a control pointer 920 for controlling the panning/tilting or zooming state of the camera in the scope 910.

The map managing software 413 constantly receives, from the image receiving software 412, the information on the panning/tilting state etc. of the camera, and, if the panning/tilting or zooming state of the camera is changed by the camera control panel 640, such change is immediately reflected on the camera icons 521, 522, 523, . . . or 531, 532, 533, . . . . The actual image transmission is made by a request from the image receiving software 412. The image receiving software 412 requests the transmission of data of a frame, through the network 100, to the image transmitting software 422 of the image transmitting terminal to which the camera is connected. In response the image transmitting software 422 transmits, to the image receiving software 412, the data of a latest captured frame in the form of divided packets. The image receiving software 412 reconstructs the frame from the packets and displays the frame in the aforementioned image display area, and again requests the image transmission. The image of a remote location is transmitted and displayed through the network, by the repetition of the above-explained process. Also the display of images of plural cameras can be realized by repeating, to the image transmitting software of each camera, a process of issuing an image transmission request, compressing the captured image and dividing the same into packets, transmitting the packets through the network, receiving the packet, reconstructing the frame therefrom, decompressing and displaying the data. The display position of the image of the video camera can be moved by dragging and dropping the image, displayed as shown in FIG. 8, to a desired image display area. FIG. 8 shows a state in which the image of the video camera 523, displayed in the image display area 614 is moved to another display area 612.

In this operation, the image receiving software 412 clears the initial image display area and alters the internal parameters, selecting the destination of the drag and drop operation as the area for displaying the image of the video camera. Thereafter the image is displayed in such D&D destination. In this operation, the logic network connection is not disconnected. The network connection, once established, is not disconnected until the image display area is dragged and dropped to the dustbin icon 632. The display of the video camera image can be terminated by dragging and dropping the image display area, which displays the video camera image to be terminated, to the dustbin icon 632, as shown in FIG. 10, which shows the state after the display of the image of the video camera 523, in the image display area 614, is terminated. In this operation, the image receiving software 412 clears such image display area and terminates the issuance of the image transmission request to the image transmitting software, and informs the camera control client 411 and the map managing software 413 of the termination of the image display. In response the camera control client 411 disconnects the network connection with the image transmitting terminal and clears the image display area used. Also the map managing software 413 removes the scope display from the camera icon 523 and renews the map.

As explained in the foregoing, the above-described configuration allows to flexibly achieve the image display, the termination of the image display and the control of each of the cameras present on the map. However, in case of simultaneously displaying the images of the desired plural cameras contained in a same map or in different maps, it is necessary to find the camera icons corresponding to the desired camera images in a single map or in plural maps and to execute the D&D operation for each camera icon.

Also in case of displaying the images of the plural cameras again in a same combination, it is necessary again to find the icons of the desired plural cameras contained in a single map or in plural maps and to execute the D&D operation for each camera icon.

Therefore, the above-described configuration is not necessarily convenient for use.

The group icon is to resolve such drawback. In the group icon, the ID's of one or more cameras and the serial numbers of the image display areas to be displayed simultaneously are registered in a set in the main memory 24, and the images of such cameras can be collectively displayed by the D&D operation of the group icon to the image display area. The grouping and the display by the D&D operation of the group icon can be achieved, under the control of the CPU 122, by grasping the correspondence between the grouped cameras and the display positions in the image display window and executing the display in response to the D&D operation and according to such correspondence.

Figure 11:
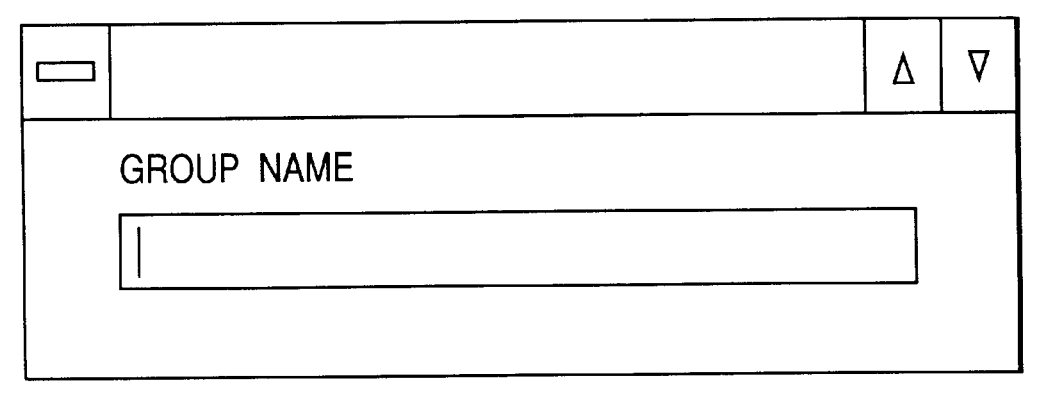
Figure 12:
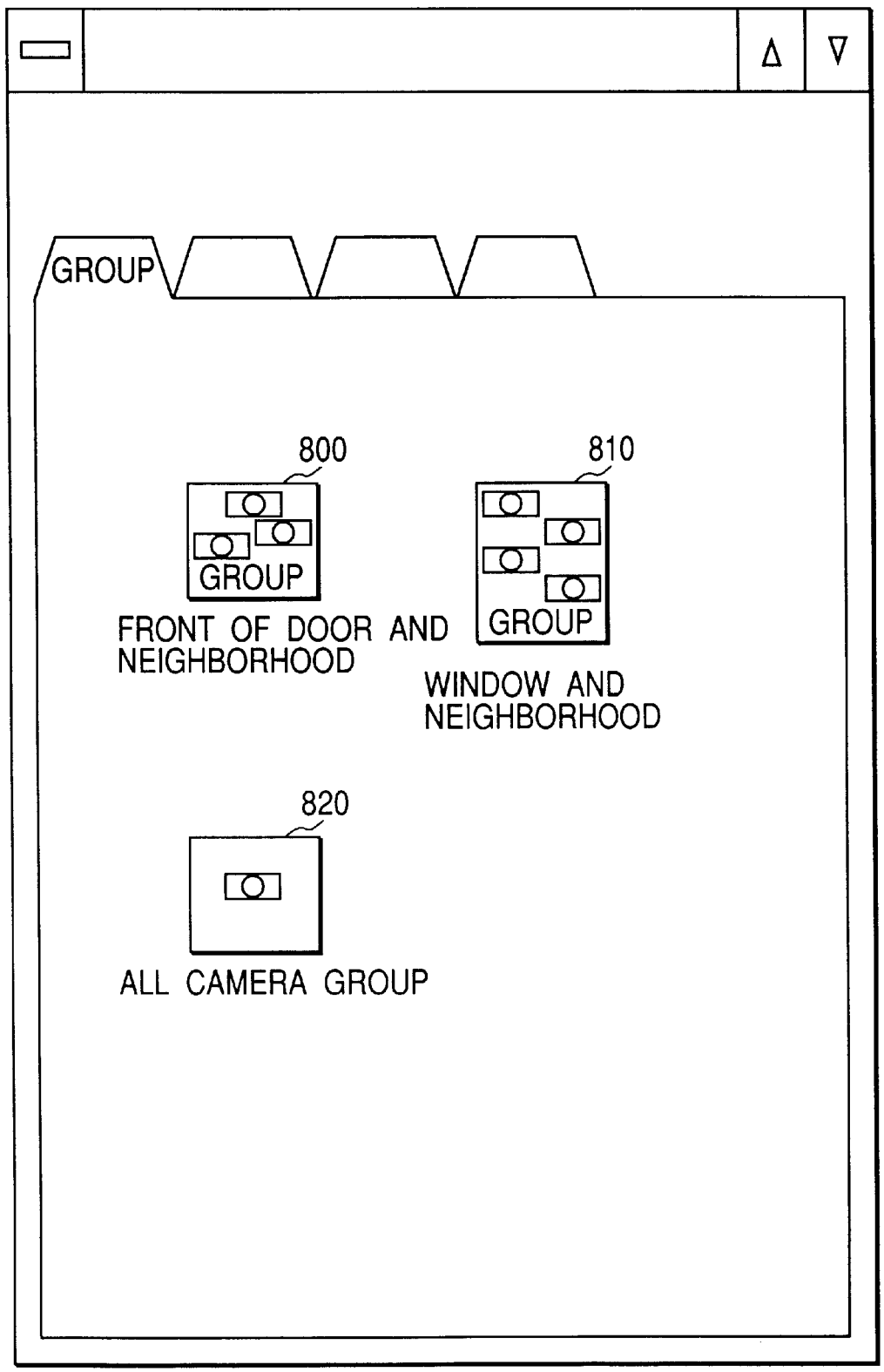
FIG. 12 is a view showing an example of the group map.

The group icon can be prepared in the following manner. At first the images of the cameras to be grouped are displayed in the image display areas by the D&D operations in a single map or over plural maps. Then a "grouping" icon on the image display window 630 is clicked, whereby a dialog box for entering a group name is displayed as shown in FIG. 11. The dialog box may be displayed on the same image area as that of the map window or of the image display window 630, or on another image area of another monitor. Then, by entering a group name from the keyboard 130, a group icon 800 with thus entered name in the group map of the map window, as shown in FIG. 12. FIG. 12 shows, as an example, a group named "front of door and neighborhood" but such name is naturally not restrictive.

There is also shown a group icon 810 indicating an already prepared group named as "window and neighborhood".

In the group icon 800 shown in FIG. 12 and named as "front of door and neighborhood", there are registered a camera 522 of the map 520 and a camera 532 of the map 530.

For achieving the collective display of the images of the cameras registered in the group icon, the group icon is dragged and dropped in the image display window, whereupon the state of the image display window at the grouping operation, namely the state of the images in the image display areas, is reproduced in the same manner as in the grouping operation.

Figure 13:
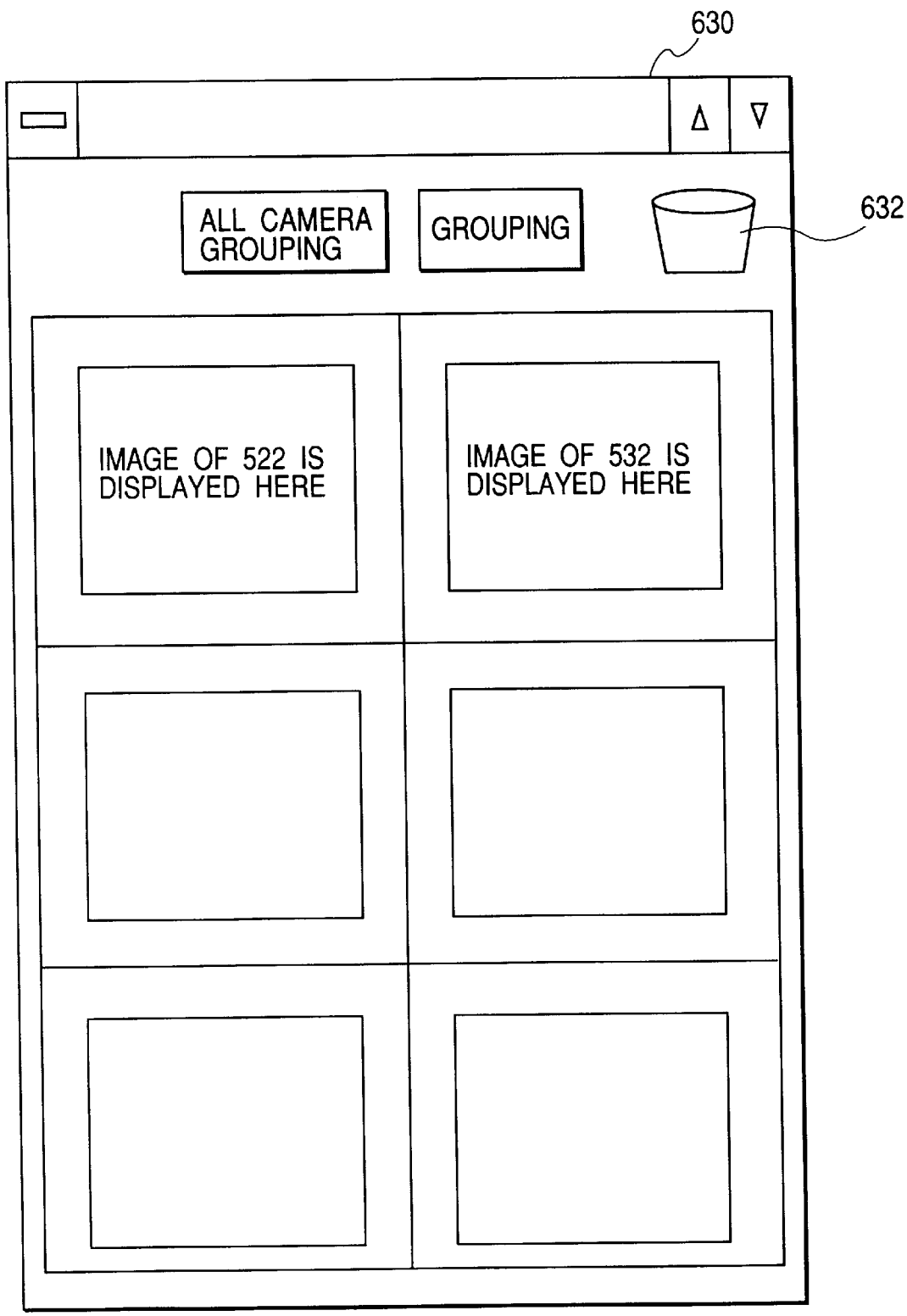
FIG. 13 is a view showing the state of display when grouping icons are displayed by the drag and drop operation.

FIG. 13 shows a state in which the images of the group icon "front of door and neighborhood" are displayed.

The group icon is effective only in effecting the collective display, and the state after the collective display is achieved is same as the display state obtained by the individual D&D operations. Consequently the algorithm of image display request and the procedure of terminating the display are same as in the display obtained with the camera icon. Also the display in the image display window may naturally be achieved, instead of the D&D operation of the group icon 800, for example by double clicks or other suitable methods.

In the following there will be explained a function of grouping all the achieved cameras into a single group. The images transmitted from all the activated cameras can be displayed in the image display areas, according to the above-described grouping function, by forming a group including all the activated cameras and executing a D&D operation (or double clicking operation) of the corresponding group icon to the image display area.

This method, however, is not convenient for use, since the procedure of simultaneously displaying the images of all the cameras is rather cumbersome. In order to solve this drawback, there is provided an all camera grouping function, which groups all the activated cameras present in a single map or in plural maps by a single operation.

In the following there will be explained a method of realizing the all camera grouping function. When an "all camera grouping" button provided on the image display window 630 is clicked, the image receiving software 412 searches the ID numbers of the activated cameras present in all the maps, stores such ID numbers in the main memory 124 and prepares an all camera grouping icon 820 in the group map of the map window, as shown in FIG. 12.

In this operation, if the number of the activated cameras exceeds the number of the image display areas in the image display window, there is displayed a message indicating such situation. Thereafter the preparation of the all camera grouping icon is canceled, or the image receiving software 412 sequentially selects the cameras of a number equal to the number of the image display areas according to the order of priority of the cameras, entered in advance by the operator through the keyboard 130 and stored in the main memory 124, whereby the ID's of thus selected cameras are memorized as a camera group represented by the all camera grouping icon. When this icon is clicked and activated, the images of thus selected cameras only are displayed in succession in the image display window.

In the following there will be explained a first variation in which, in response to an instruction for the all camera grouping, all the cameras are always grouped. When the "all camera grouping" button is clicked by the cursor of the mouse 128, the image receiving software 412 stores the ID's of all the activated cameras in the main memory 124 thereby preparing the all camera grouping icon, assuming to achieve the display by reducing the size of the areas in the image display window. When the all camera grouping icon is clicked by the cursor of the mouse 128, the image receiving software 412 counts the number of the camera ID's stored in the main memory 124, then forms the display areas of the counted number in the image display window, and executes the image display process according to the ID's.

In this case, the number of the divided areas in the image display window naturally varies according to the number of the activated cameras, and such display is also controlled by the image receiving software 412.

In a second variation, if the number of the activated cameras exceeds a predetermined number when the "all camera grouping" button is clicked by the mouse 128, an all camera grouping icon is prepared taking such predetermined number as a unit. In this case the all camera grouping icons are prepared in a number equal to the quotient of the division of the number of the activated cameras by the above-mentioned predetermined number. In this case, in order that the operator can identify the cameras which can be controlled when each of the plural all camera grouping icons is clicked by the mouse 128, the image receiving software 412 adds the information of the maps (1F, 2F, warehouse etc.) containing the grouped cameras as the name of each all camera grouping icon and displays such names in the group map.

The images of the cameras registered in the all camera grouping icon thus prepared can be collectively displayed by dragging and dropping such icon in the image display window or double clicking such icon. The all camera grouping icon is effective only in the initial phase of collectively displaying the images of all the cameras, and, after such collective display is achieved, the display is same as in the state in which all the camera images are displayed in the image display window by the individual D&D operations for all the cameras. Therefore, the algorithm for the image display request and the procedure for terminating the display are identical with those in case of the image display obtained by the single camera icon or the camera group icon.

Also the above-explained first and second variations may be respectively adopted as first and second modes of grouping of all the cameras and either mode may be selectively employed by the mode designation of the operator (as an initial setting through the keyboard 130).

In such case, the mode information is stored in the main memory 124, and, in response to an instruction for the "all camera grouping", the image receiving software 412 executes the grouping process according to the preset mode.

In the above-described configuration, the second mode can be adopted in case it is known in advance that a large number of cameras are activated, thereby avoiding the reduction in image size resulting from the image reception from the unnecessary image transmitting terminals.

The above-described configuration allows, without rearrangement of the camera cables, to realize not only a collective process of simultaneously displaying the images of plural cameras connected to a same synthesizing device or a switcher and belonging to a same map but also a collective process of simultaneously displaying the images, or terminating the display thereof, of plural cameras belonging to plural maps. It is therefore possible to handle not only the cameras belonging to a same map or to geographically limited locations but also the cameras belonging to different maps as a single group, thereby flexibly responding to the requirements of the user.

Figure 16:
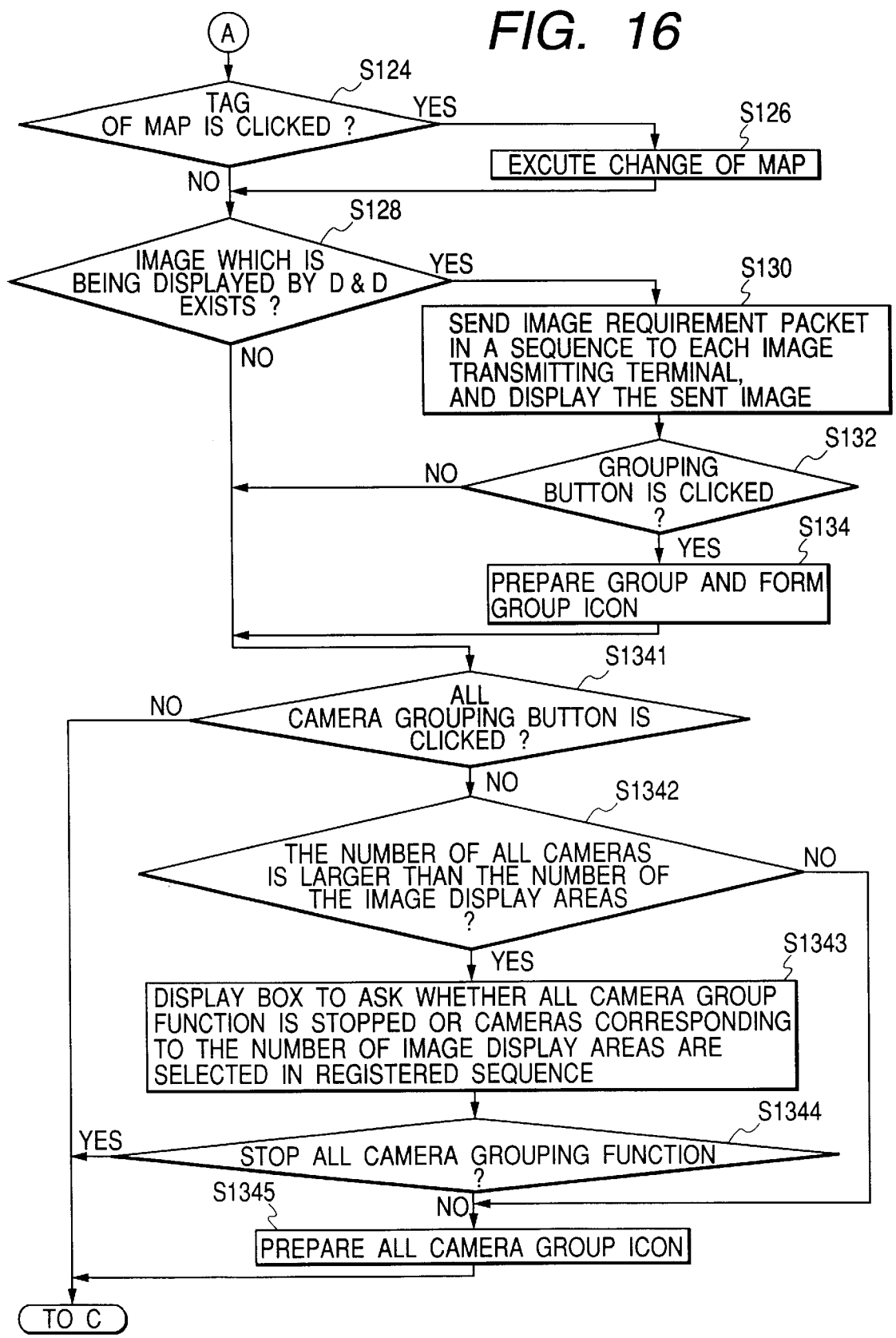
Figure 17:
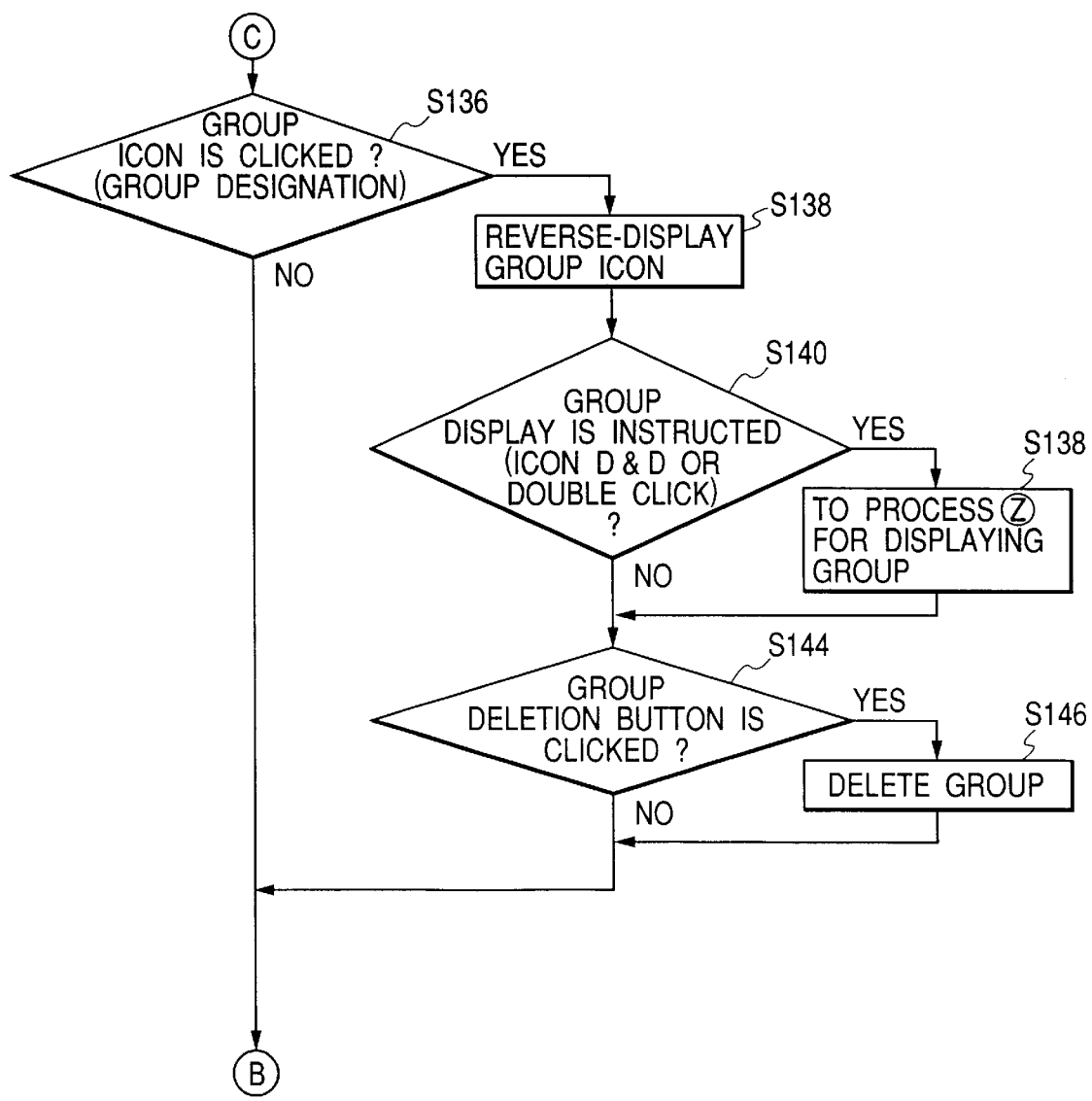

In the following there will be explained the software employed in the foregoing embodiment, with reference to FIGS. 15 to 17, which are flow charts showing the control sequence of the entire device of the present embodiment.

Figure 5:
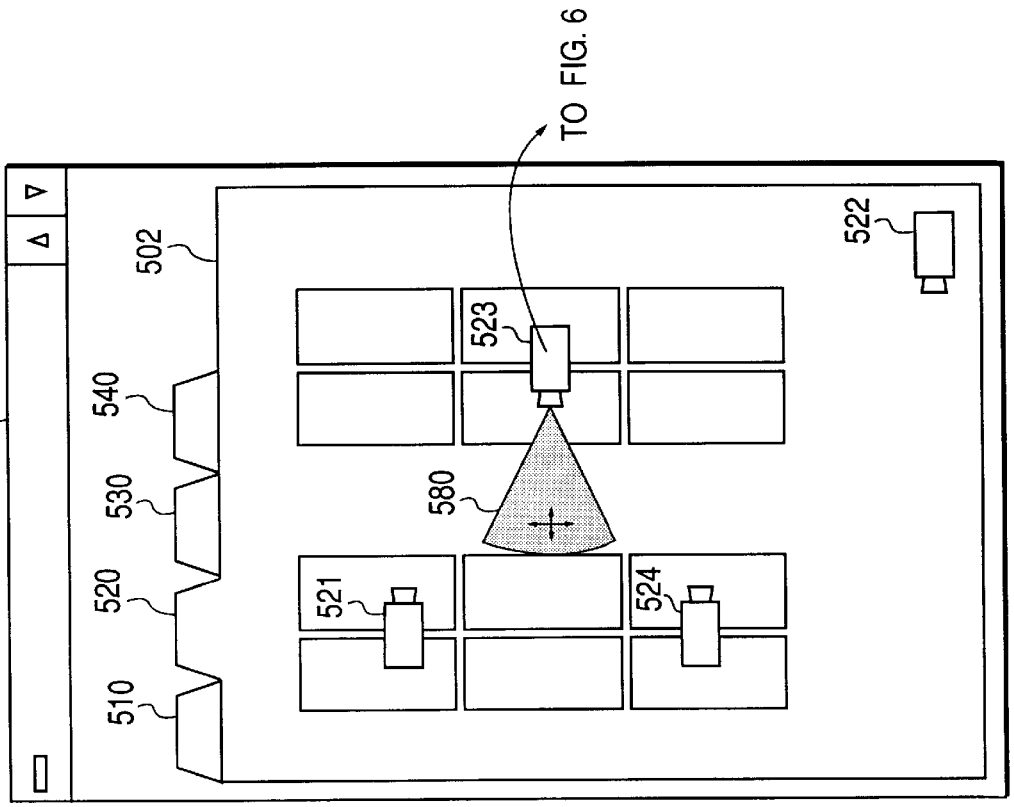
FIG. 5 is a view showing a window 600 for displaying the input image signal.

In the following there will be explained steps of the above-mentioned flow charts:

S100: The map managing software 413 shown in FIG. 2 displays, for example the map window 500 shown in FIG. 3, on the bit map display 35;

S102: Subsequent to the step S100, the image receiving software 412 shown in FIG. 2 displays, for example the image window 600 shown in FIG. 5, on the bit map display 35;

S104: Subsequent to the step S102, the camera control client 411 shown in FIG. 2 displays the camera control panel 640 on the display 35;

S106: It discriminates whether the icon of a camera displayed on the map window shown in FIG. 3 is clicked, and, if clicked, the sequence proceeds to a step S108 but, if not, it proceeds to a step S112.

Figure 15:
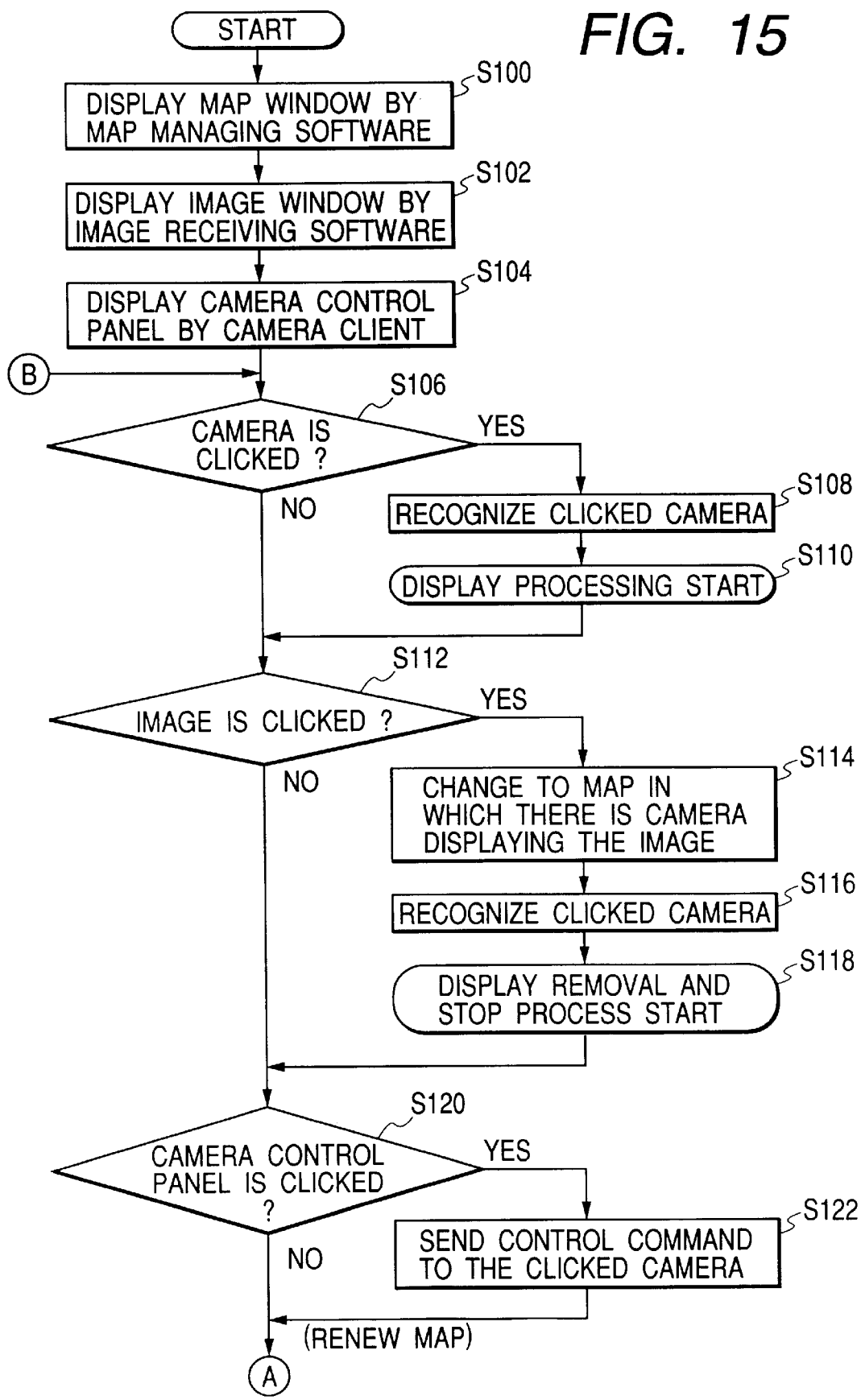
FIGS. 15, 16 and 17 are flow charts showing a main flow of the apparatus of first and second embodiments.

The steps shown in FIG. 15 are executed by the operating system corresponding to the CPU 122. In the foregoing description, the steps S100, S102 and S104 are executed independently, but it is also possible to execute the steps S102 and S104 by calling the routines therefor from the step S100:

S108: The clicked camera is confirmed, that is the selected camera is determined;

S110: It initiates a display routine, which will be explained later with reference to FIG. 18;

S112: It discriminates whether a desired image, among the images displayed in the image window 600 shown in FIG. 5, has been clicked, and, if clicked, the sequence proceeds to a step S144, but, if not, it proceeds to a step S120;

S114: It discriminates, at the image clicking, whether the map window shown in FIG. 3 displays the position of the clicked camera which is to generate the image signal, and, if the camera position is not displayed, it gives an instruction to the map managing software 413 to switch the map display in the window shown in FIG. 3 to a map including such camera;

S116: The camera corresponding to the clicked image is confirmed, as in the step S108;

S118: It initiates a display moving/terminating routine which is to be explained later with reference to FIG. 20;

S120: It discriminates whether the camera control panel 640 shown in FIG. 3 has been clicked, and, if clicked, the sequence branches to a step S122;

S122: It transfers a command, designated by the control panel, to the clicked camera through the network 100;

S124: It discriminates whether any of the map tags 510 to 540 shown in FIG. 3 has been clicked, and, if clicked, the sequence proceeds to a step S126, but, if not, the sequence proceeds to a step S128;

S126: It sends an instruction to the map managing software 413 so as to display a map corresponding to the clicked map tag, among the tags 510 to 540;

S128: It discriminates whether the map displayed on the bit map display 35 includes an image which is designated for display by the D&D operation, and, if such designated image is present, the sequence proceeds to a step S130, but, if absent, it proceeds to a step S136;

S130: If the designated image or images are present, a packet including an image request signal is transmitted in succession to the cameras or the image transmitting terminals corresponding to such images, and the image transmitted from the terminal which has received the request by the transmitted packet is displayed on the bit map display 35. The packet contains an address, on the network, for designating the camera or the image transmitting terminal corresponding to the image mentioned above;

S132: It discriminates whether the grouping button has been clicked, and, if clicked, the sequence proceeds to a step S134, but, if not, the sequence proceeds to C;

S134: It executes grouping of the cameras which transmit the images on the bit map display 35 and prepares a grouping icon;

S1341: It discriminates whether the all camera grouping button has been clicked, and, if clicked, the sequence proceeds to a step S1342, but, if not, the sequence proceeds to C;

S1342: It compares the number of the image display areas in the image display window with the number of the activated cameras, and, if the latter exceeds the former, the sequence proceeds to a step S1343, but, if not, the sequence proceeds to a step S1345;

S1343: It displays a message requesting the selection by the user whether to interrupt the preparation of the all camera grouping icon, or to successively select the cameras according to the order of registration thereof by a number equal to that of the image display areas for memory as a camera group represented by the all camera grouping icon;

S1344: It discriminates whether the all camera grouping function has been interrupted, and, if the interruption has been instructed, the sequence proceeds to C, but, if the grouping function has been continued, the sequence proceeds to a step S1345;

S1345: It prepares the all camera grouping icon, representing all the cameras (or the selected cameras of a number equal to that of the image display areas);

S136: It discriminates whether the grouping icon has been clicked, and, if clicked, the sequence proceeds to B, but, if not, it proceeds to a step S138;

S138: It executes inverted display of the clicked group icon;

S140: It discriminates whether a display instruction has been given to the group icon, and, if given, the sequence proceeds to a group display flow in a step S142, to be explained later with reference to FIG. 23, but, if not, the sequence proceeds to a step S144;

S144: It discriminates whether the group deleting button 710 has been clicked, and, if clicked, the sequence proceeds to a step S146, but, if not, the sequence proceeds to B;

S146: It deletes the designated group.

Figure 18:
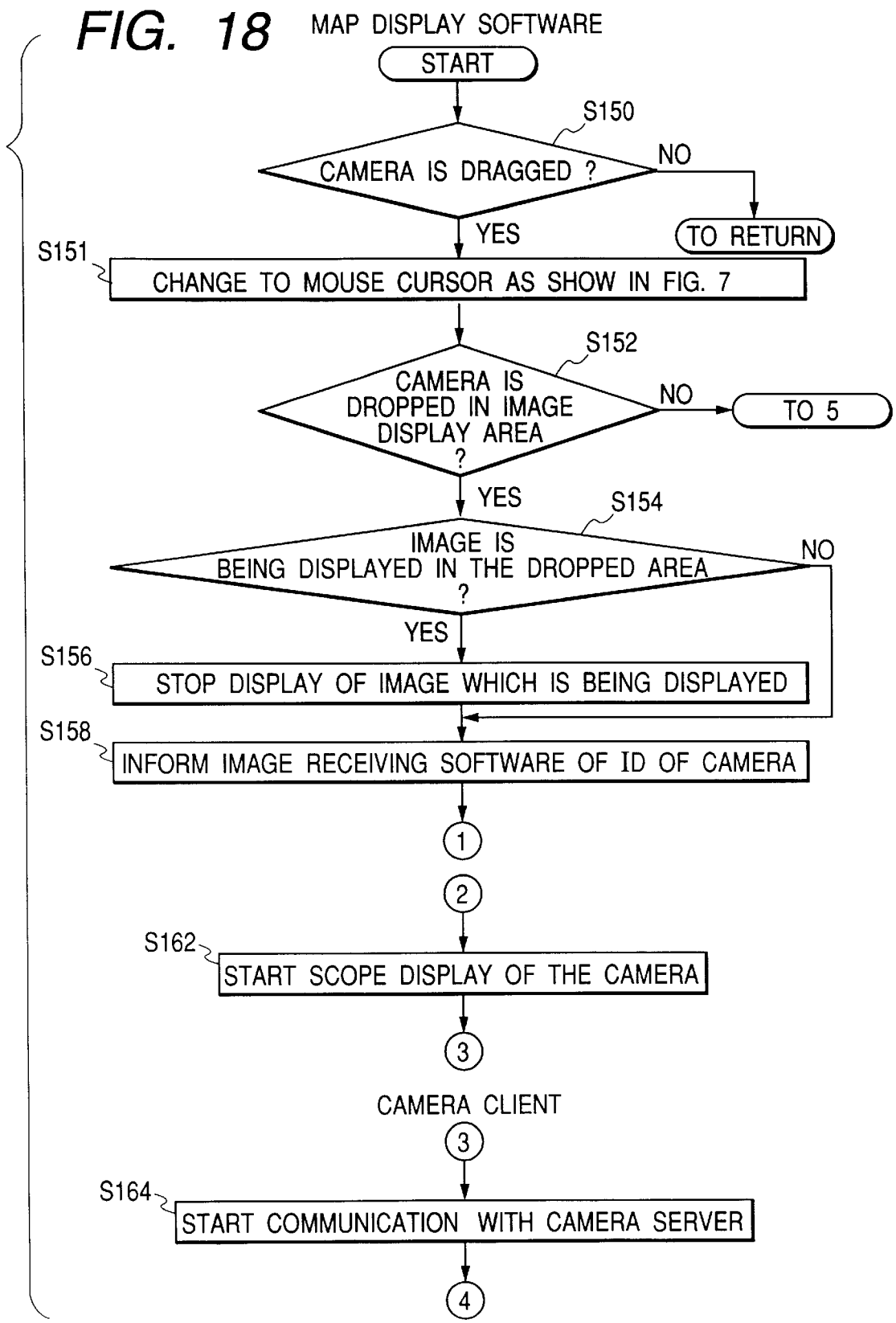
FIG. 18 is a flow chart showing the control sequence of a map display software in the display process.
Figure 19:
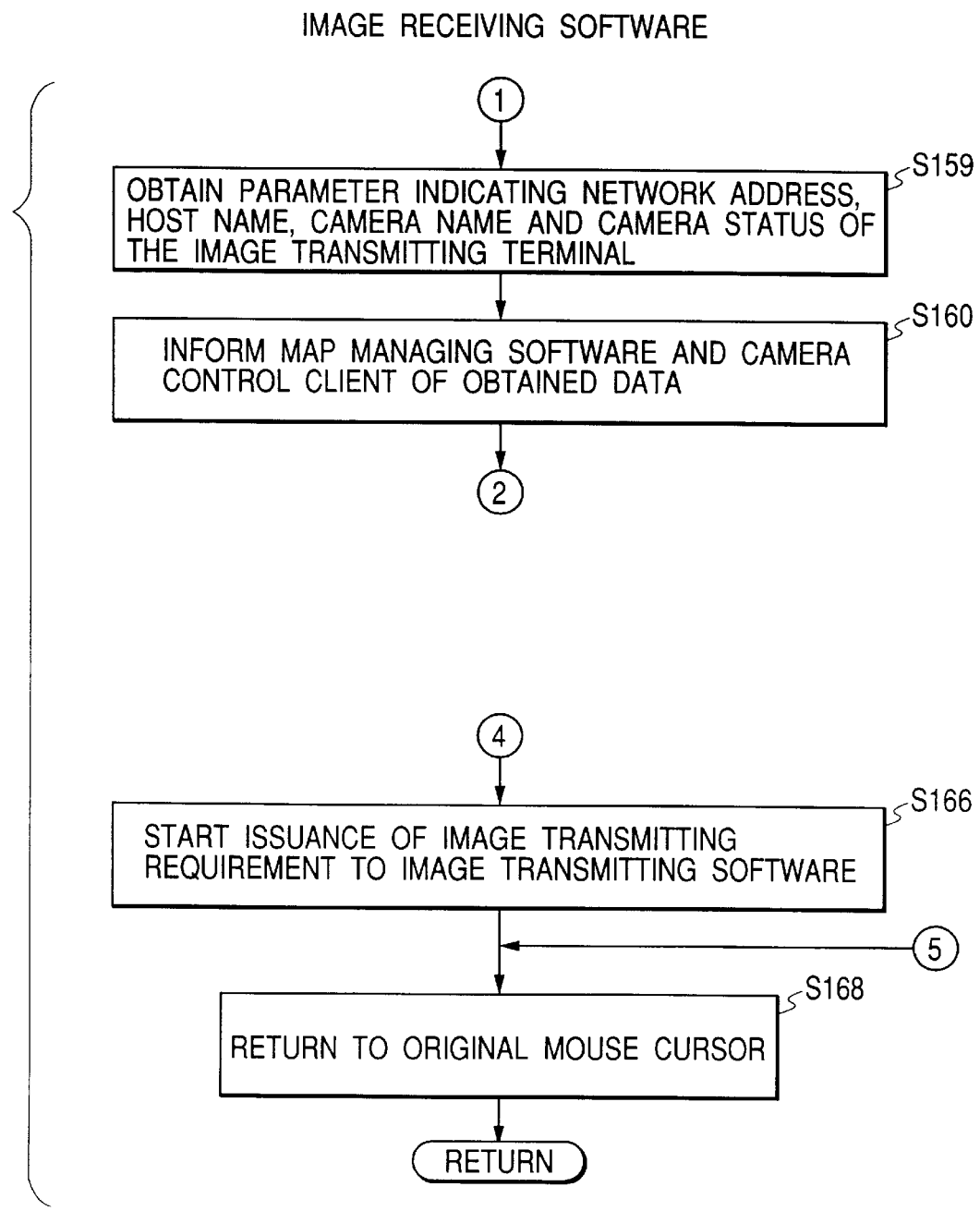
FIG. 19 is a flow chart showing the control sequence of an image reception software in the display process.

In the following there will be explained the display routine referred to in the step S110, with reference to FIG. 18:

S150: In this routine, this step at first discriminates whether a displayed camera icon has been dragged. If the clicking of the camera icon by the user continues from the step S106 in FIG. 15 to the present step, the sequence proceeds to a step S151, but, if the clicking by the user is discontinued, the present step is terminated and the sequence returns to the original routine;

S151: It changes the mouse cursor to a display as shown in FIG. 7 during the dragging operation, in order that the user can easily understand that the camera dragging operation is in progress. The mouse cursor is not limited to the shape shown in FIG. 7 but may assume any other display form that allows the user to understand that the camera dragging operation is in progress;

S152: It discriminates, from the state of the clicking button of the mouse 128 shown in FIG. 1, whether the camera-shaped cursor, as shown in FIG. 7, has been dropped, and it also discriminates whether the camera-shaped cursor has been dropped in any of the image display areas 610 to 620 shown in FIG. 5. Such discrimination is executed by the map managing software 413 by comparison of the coordinates of the image display areas 610 to 620 with those of the dropped point of the camera-shaped cursor, and, if the cursor is dropped within the image display areas, the sequence branches to a step S154, but, if it is dropped outside the image display areas, the sequence branches to a step S168 for returning the mouse cursor to the original state before the dragging operation in the step S150;

S154: It causes the map managing software 412 to discriminate whether the dropped area is in the course of image display operation. The map managing software 412 manages the camera images displayed in the image display areas 610 to 620, by constant storage in a table memory. If the image display operation is in progress, the sequence proceeds to a step S156, but, if not, the sequence proceeds to a step S158;

S156: It interrupts the image display already in progress in the dropped area, in the same manner as in the discarding in the dustbin;

S158: It informs the image receiving software 412 shown in FIG. 2 of the ID information of the dragged and dropped camera;

S159: It acquires, from the main memory 124, the network address, host name, camera name and parameters indicating the camera state of the camera of which the ID is informed in the step S158. The parameters include information on the focal length, white balance and photographing direction. The main memory 124 stores the network addresses, host names, camera names and the parameters indicating the camera states of all the image signal generating sources constituting the present system;

S160: It sends the data acquired in the step S159 to the map managing software 412 and the camera control client 411;

S162: Based on the data acquired in the step S160, it executes a scope display of the camera, as shown by 580 in FIG. 6, namely indicating the image angle of the camera, the focal length thereof and the direction of the camera;

S164: Subsequent to the step S162, communication is made with the camera control server 421;

S166: It instructs the image receiving software 412 so as to transmit an image request signal to the selected camera in order to receive the image signal from the selected camera. After the transmission of the image request signal to the selected camera, the image receiving software 412 repeats the transmission of the image request signal periodically until the transmission of the image signal is terminated in a step S178 to be explained later.

Thus the video camera outputs the image signal of a frame repeatedly, whereby a moving image is displayed on the monitor;

S168: It returns the mouse cursor, moved by the D&D operation, to the original position.

Figure 20:
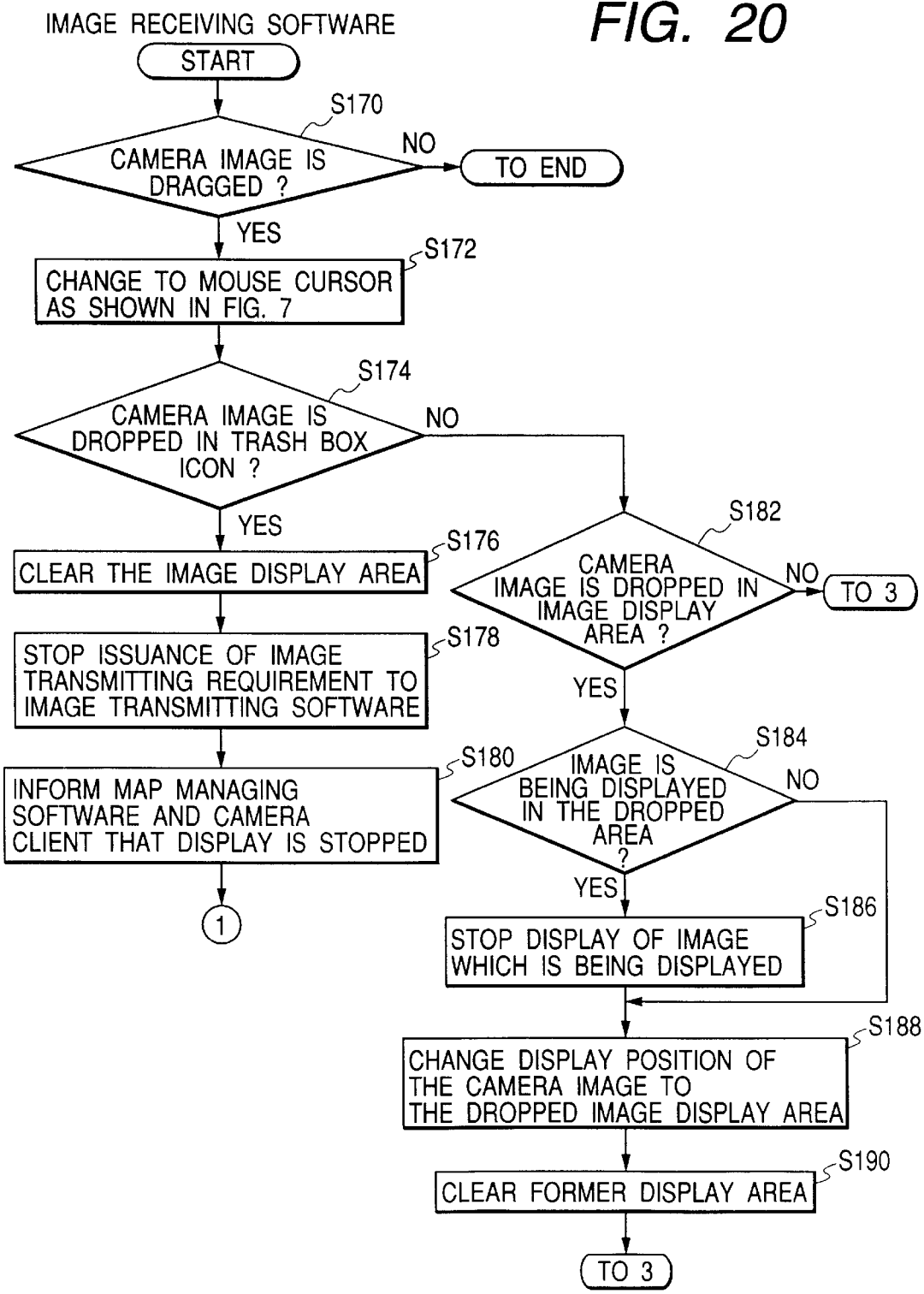
FIG. 20 is a flow chart showing the control sequence of the image reception software in the non- display or position movement process.
Figure 21:
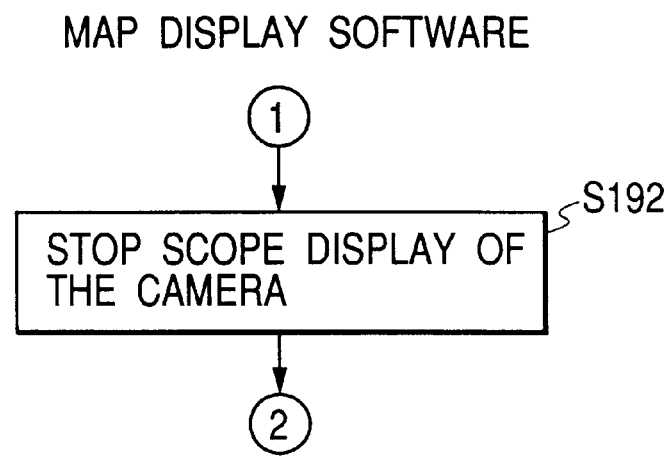
FIG. 21 is a flow chart showing the control sequence of the map display software in the non-display or position movement process.
Figure 22:
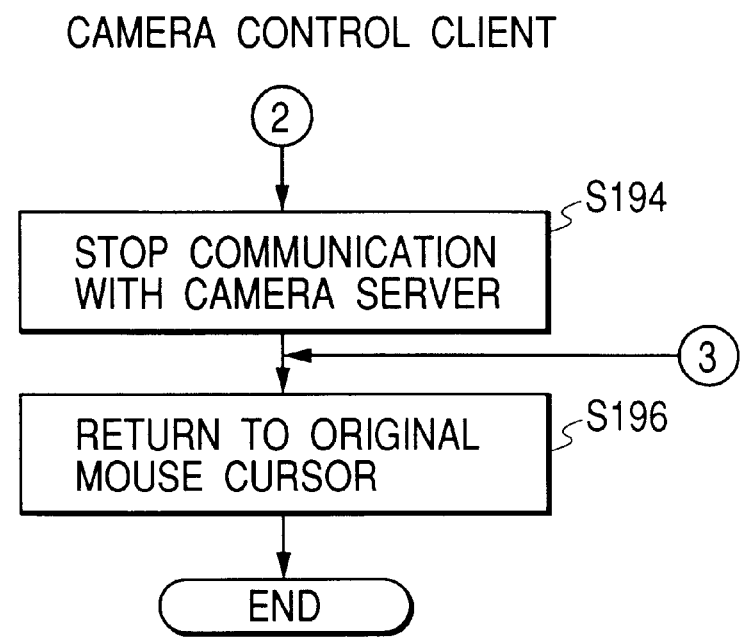
FIG. 22 is a flow chart showing the control sequence of a camera client in the non-display or position movement process.

In the following there will be explained a display moving/terminating routine, referred to in the step S118 in FIG. 15, with reference to FIGS. 20 and 21:

S170: It discriminates whether the clicking of the image in the step S112 has been continued, and, if continued, the sequence proceeds to a step S172, but, if not, the present routine is terminated;

S172: It changes the shape of the mouse cursor for example as shown in FIG. 7, in the same manner as in the step S151;

S174: It discriminates whether the image dragged by the mouse cursor has been dropped in the dustbin, and, if dropped, the sequence proceeds to a step S176, but, if not, the sequence proceeds to a step S182;

S176: In case of the dropping into the dustbin, the image display area subjected to the D&D operation is cleared to a state without display or a state of blue back;

S178: It instructs the image receiving software 412 to terminate the issuance of the image transmission request to the communication terminal, for example, a video camera, which has been transmitting the image cleared in the step S176, whereby the communication terminal terminates the transmission of the image signal;

S180: Subsequent to the step S178, it informs the map managing software 413 and the camera control client 411 of the termination of the display on the bit map display 135, and the sequence then proceeds to a step S192;

S182: In case the step S174 identifies that the camera image has not been dropped in the dustbin icon, this step identifies one of the image display areas 610 to 620 in which the camera image has been dropped;

S184: Similar to as the step S152;

S186: Similar to the step S154;

S188: It displays the image signal of the dragged and dropped camera in the dropped image display position;

S190: It clears the image signal in the area in which the image signal of the camera has been displayed;

S192: It erases the scope display of the camera, started in the step S162;

S194: It terminates the communication with the camera server;

S196: Similar to the step S168.

In the following there will be explained a group display sequence in the step S142, with reference to FIG. 23:

S200: It discriminates whether the image transmitted from the camera is being displayed on the bit map display 35;

S202: As the camera image is being displayed on the bit map display 35, this step terminates such camera image display and clears the image display area;

S204: It terminates the communication with the camera which has transmitted the image of which display is terminated in the step S202;

S206: It executes the image display of each of the cameras registered in the group (by informing the image receiving software 412 shown in FIG. 2 of the ID information of the cameras registered in the group, then acquiring the network address, host name, camera name and parameters indicating the camera state of thus informed camera, from the main memory 124, and sending the acquired data to the camera control client 411. The parameters include the information on the focal length, white balance and photographing direction. The main memory 124 stores the network addresses, host names, camera names and parameters indicating the camera states on all the image signal generating sources constituting the present system);

S208: The control client 411 initiates the network communication with the camera control server of each camera.

[Embodiment 2]

The present embodiment provides a method of preparation of the group icon from the map display window.

The embodiment 2 is realized by providing the map display window of the embodiment 1 with camera icon selecting means, group preparing means and group deleting means. Each of these means may be realized by a pull-down menu or a button. In the following there will be explained an example.

The selection of the camera is achieved by clicking the camera icon. In response to the clicking, the frame of the camera icon changes in color, indicating that the camera is in the selected state. The color change is convenient for the user in understanding the selected camera. If another camera icon is clicked in this state, the previously selected camera is shifted to the unselected state and the selection is shifted to the newly clicked camera. Also plural cameras can be selected by the clicking operation combined with the depression of the Shift button of the keyboard.

Figure 14:
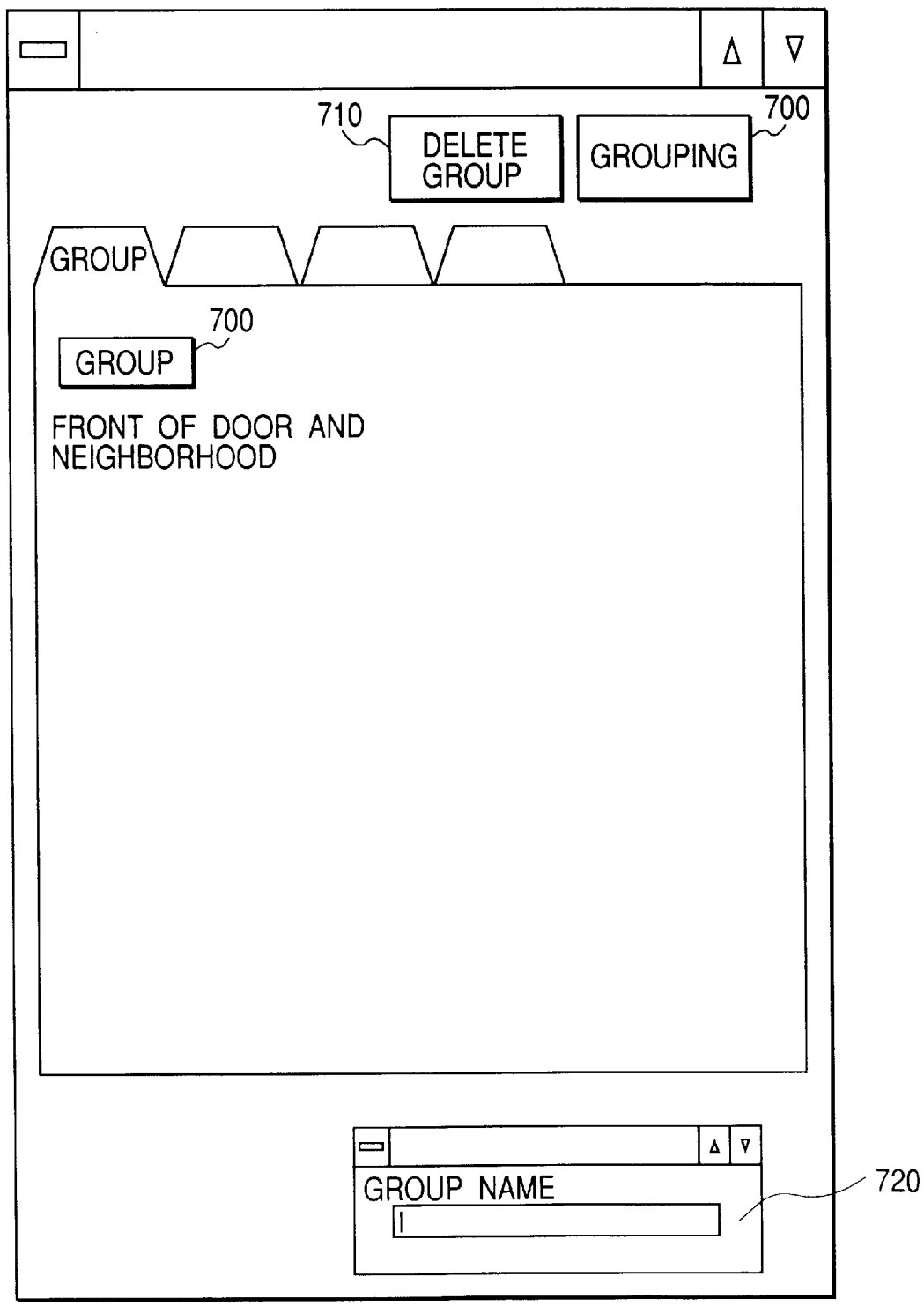
FIG. 14 is a view showing an example of the map display window with grouping and group deleting means.

The grouping can be applied to thus selected cameras. After arbitrary plural cameras are selected, the grouping button 700 of the map display window shown in FIG. 14 is clicked, whereby the grouping dialog 720 is displayed to enable the group preparation. Thus the group icon is prepared in the same manner as in the first embodiment.

The image display on the image display window can be realized as in the first embodiment, by the selection of thus prepared group icon. However, in contrast to the camera icon, the selected state of the group icon is indicated by the inverted display of the group icon name.

The deletion of a group can be achieved by selecting the icon of the group to be deleted and clicking the group deleting button 710 of the map display window.

The display of a group can be realized, as in the embodiment 1, by the D&D operation of the group icon to the image display window. It is also possible to prepare a group display button in the map display window, and clicking such display button after the selection of the group icon.

In the grouping operation, the cameras to be grouped may be designated not only from the image display window or from the maps but also by the camera ID known to the user.

The utilization of the group concept allows, in the display of the camera images, to dispense with the D&D operations for the individual cameras, thereby reducing the works required therefor.

Also the user can combine the cameras, located over plural maps, in an arbitrary classification not bound by the planar maps, thereby enabling flexible utilization of the system.

In the apparatus capable of communication with plural image transmitting terminals, the above-described configuration allows to easily display, or the monitor, the images transmitted from the active image transmitting terminals among the above-mentioned plural terminals. Consequently the operability is improved in comparison with the configuration in which the operator is required to issue the instruction for communication after confirming whether each image transmitting terminal is active.

It is also rendered possible to promptly and simultaneously confirm the received images, even plural image transmitting terminals are present.

Also since the image transmitting terminals can be grouped in selective manner, it is rendered possible to achieve grouping, even in case the number of the activated image transmitting terminals exceeds the predetermined number of image displays, without the preparatory operation by the operator such as confirmation in advance of the number of possible image displays and the number of the activated image transmitting terminals and deactivations of unnecessary terminals.

Also the grouping can be achieved according to the intention of the operator, as the grouping can be conducted according to a predetermined order or priority.

It is also rendered possible to always receive and display the images from the activated image transmitting terminals, regardless of the number thereof, without the preparatory operations required in the conventional configuration such as confirming the number of the activated image transmitting terminals in advance and interrupting the communication with the terminals in excess of the number of the image display areas. It is also possible to simultaneously display the images from all the activated image transmitting terminals.

Furthermore, even if the activated image transmitting terminals are large in number, there can be formed plural groups each including a predetermined number of terminals, so that the operator can achieve the grouping without paying attention to the number of the activated image transmitting terminals. In case all the activated image transmitting terminals are incorporated into a single group, the display area per terminal may become too small for visual observation, depending on the number of such activated terminals, but such drawback can be avoided by the formation of plural groups each containing a predetermined number of terminals regardless of the number of the activated image transmitting terminals.

Furthermore, the operator can easily identify each group since each group is given a name.

Furthermore, the operator can designate each group after confirming such group by the name given according to the location of the group.

Furthermore, the grouping can be selectively achieved according to the setting of the operator.

[Other embodiments of the invention]

Furthermore, the foregoing embodiments encompass a method of storing, in a memory medium, a program for operating the configuration of the foregoing embodiments so as to realize the functions thereof and executing the foregoing embodiments according to the program stored in such memory medium, and also encompass such memory medium storing such program.

Such memory medium can be composed, for example, of a floppy disk, a hard disk, an optical disk, a magnetooptical disk, a CD-ROM, a magnetic tape, a non-volatile memory card or a ROM.

Furthermore, the foregoing embodiments encompass not only the case in which the process is executed solely by the program stored in the memory medium but also the case of realizing the functions of the foregoing embodiments on the operating system in cooperation with the functions of another software or another expansion board.

What is claimed is:

1. A communication apparatus comprising:
   instruction means for inputting an instruction for grouping, among plural image transmitting terminals, those in activating state;
   obtaining means for obtaining information of activating image transmitting terminals among the plural transmitting terminals, in response to the instruction by said instruction means;
   generation means for generating a symbol corresponding to the activating image transmitting terminals obtained by said obtaining means; and
   output means for outputting, to a monitor, images of image data received from said activating image transmitting terminals according to an access to the symbol.

2. A communication apparatus according to claim 1, wherein said output means is multi image display means for executing, on the monitor, multi image display of the image data received from said activating image transmitting terminals, according to the access to the symbol.

3. A communication apparatus according to claim 1, wherein said generation means is adapted, in case a number of said activating image transmitting terminals exceeds a number of display areas on the monitor, to selectively group, among said image transmitting terminals, those manually instructed of an operator.

4. A communication apparatus according to claim 3, wherein said generation means executes said grouping according an order of priority designated in advance.

5. A communication apparatus according to claim 1, wherein:
   said generation means is adapted, according to the instruction, to group all said activating image transmitting terminals and to generate a symbol corresponding to the group; and
   wherein said output means is adapted, according to the access to the symbol, to output, to the monitor, multi images of a number of divisions corresponding to the number of all the activating image transmitting terminals, in order to display, on the monitor, images corresponding to the image data generated by all said activating image transmitting terminals.

6. A communication apparatus according to claim 1, wherein
   said generation means is adapted, according to the instruction, to form plural groups each including a predetermined number of said activating image transmitting terminals and to generate symbols corresponding to the plural groups; and
   wherein said output means is adapted, according to the access to the plural symbols, to output, to the monitor, images of image data received from the image transmitting terminals corresponding to the accessed symbol.

7. A communication apparatus according to claim 6, wherein said predetermined number is a predetermined number of images outputable to the monitor.

8. A communication apparatus according to claim 6, wherein said generation means is adapted to generate a name for each of the symbols corresponding to the plural groups.

9. A communication apparatus according to claim 8, further comprising means for storing information indicating a location of said activating image transmitting terminal, wherein t he name is related wit h the location.

10. A communication apparatus comprising:
    instruction means for inputting an instruction for grouping, among plural image transmitting terminals, those in activating state;
    obtaining means for obtaining information of activating image transmitting terminals among the plural transmitting terminals, in response to the instruction by said instruction means;
    output means including a first outputting mode adapted, according to the obtaining, to group all said activating image transmitting terminals and generating a symbol corresponding to the group, and, according to the access to the symbol, to output to the monitor multi images of a number of divisions corresponding to the number of all the activating image transmitting terminals, in order to display, on the monitor, images corresponding to the image data generated by all said activating image transmitting terminals;
    a second outputting mode adapted, according to the obtaining instruction, to form plural groups each including a predetermined number of said activating image transmitting terminals and to generate symbols corresponding to the plural groups, and, according to the access to the plural symbols, to output, to the monitor, images of image data received from the image transmitting terminals corresponding to the accessed symbol; and
    setting means for setting said output mode.

11. A communication display method comprising:
    inputting an instruction for grouping, among plural image transmitting terminals, those in activating state;
    obtaining information of activating image transmitting terminals among the plural transmitting terminals, in response to the instruction;
    generating a symbol corresponding to the activating image transmitting terminals obtained by said obtaining of said information; and
    outputting, to a monitor, images of image data received from said activating image transmitting terminals according to an access to the symbol.

12. A communication display method according to claim 11, wherein said output executes, on the monitor, multi image display of the image data received from said activating image transmitting terminals, according to the access to said symbol.

13. A communication display method according to claim 11, wherein, in case a number of said activating image transmitting terminals exceeds a number of display areas on the monitor, grouping is executed selectively among said image transmitting terminals.

14. A communication display method according to claim 13, wherein said grouping is executed according to an order of priority designated in advance.

15. A communication display method according to claim 11, wherein:

according to said instruction, all said activating image transmitting terminals are grouped and a symbol corresponding to the group is generated and according to the access to said symbol, multi images of a number of divisions corresponding to the number of all the activating image transmitting terminals are outputted to the monitor, in order to display, on the monitor, images corresponding to the image data generated by all said activating image transmitting terminals.

16. A communication display method according to claim 11, wherein:

according to the instruction, plural groups each including a predetermined number of said activating image transmitting terminals are formed and symbols corresponding to the plural groups are generated; and according to the access to the plural symbols, images of image data received from the image transmitting terminals corresponding to the accessed symbol are outputted to the monitor.

17. A communication display method according to claim 16, wherein said predetermined number is a predetermined number of images outputable to the monitor.

18. A communication display method according to claim 16, further comprising a step of generating a name for each of the symbols corresponding to the plural groups.

19. A communication display method according to claim 18, further comprising a step of storing information indicating the location of said activating image transmitting terminal, wherein said name is related with said location.

20. A communication display method comprising:

inputting an instruction for grouping, among plural image transmitting terminals, those in activating state;

obtaining information of activating image transmitting terminals among the plural transmitting terminals, in response to the instruction;

outputting by a first outputting mode adapted, according to the obtaining, to group all said activating image transmitting terminals and generating a symbol corresponding to the group, and, according to the access to the symbol, to output to the monitor multi images of a number of divisions corresponding to the number of all the activating image transmitting terminals, in order to display, on the monitor, images corresponding to the image data generated by all said activating image transmitting terminals; and outputting by a second outputting mode adapted, according to the obtaining, to form plural groups each including a predetermined number of said activating image transmitting terminals and to generate symbols corresponding to the plural groups, and, according to the access to the plural symbols, to output, to the monitor, images of image data received from the image transmitting terminals corresponding to the accessed symbol; and setting said output mode.

21. Computer executable software code stored on a computer readable medium, comprising:

code for inputting an instruction for grouping, among plural image transmitting terminals, those in activating state;

code for obtaining information of activating image transmitting terminals among the plural transmitting terminals, in response to the instruction;

code for generating a symbol corresponding to the activating image transmitting terminals obtained by said obtaining means; and code for outputting, to a monitor, images of image data received from said activating image transmitting terminals according to an access to the symbol.

* * * * *

UNITED STATES PATENT AND TRADEMARK OFFICE
CERTIFICATE OF CORRECTION

PATENT NO. : 6,101,536
DATED : August 8, 2000
INVENTOR(S) : Masaaki Kotani and Hiroki Yonezawa It is certified that error appears in the above-identified patent and that said Letters Patent is hereby corrected as shown below:

<u>Column 4,</u>
Line 28, please delete "c od e", and insert therefor -- code --.
Lines 37-38, please delete "control in g", and insert therefor -- controlling --.

<u>Column 16, claim 9,</u>
Line 21, please delete "t he"; and insert therefor -- the --.
Line 21, please delete "wit h"; and insert therefor -- with --

Signed and Sealed this

Twenty-sixth Day of February, 2002

Attest:

JAMES E. ROGAN
*Attesting Officer*     *Director of the United States Patent and Trademark Office*